United States Patent
Talon et al.

(10) Patent No.: US 12,433,445 B2
(45) Date of Patent: Oct. 7, 2025

(54) CLEANING APPARATUS FOR A BEVERAGE PREPARATION MACHINE

(71) Applicant: SOCIETE DES PRODUITS NESTLE S.A., Vevey (CH)

(72) Inventors: Christian Talon, Vufflens-le-Chateau (CH); Christophe Sebastien Paul Heydel, Chez-le-Bart (CH)

(73) Assignee: Société des Produits Nestlé S.A., Vevey (CH)

( * ) Notice: Subject to any disclaimer, the term of this patent is extended or adjusted under 35 U.S.C. 154(b) by 780 days.

(21) Appl. No.: 17/756,768

(22) PCT Filed: Dec. 1, 2020

(86) PCT No.: PCT/EP2020/084070
§ 371 (c)(1),
(2) Date: Jun. 2, 2022

(87) PCT Pub. No.: WO2021/110654
PCT Pub. Date: Jun. 10, 2021

(65) Prior Publication Data
US 2023/0032667 A1    Feb. 2, 2023

(30) Foreign Application Priority Data
Dec. 4, 2019    (EP) .................... 19213435

(51) Int. Cl.
*A47J 31/60*    (2006.01)
*A47J 31/36*    (2006.01)

(52) U.S. Cl.
CPC ........... *A47J 31/60* (2013.01); *A47J 31/3628* (2013.01); *A47J 31/3695* (2013.01)

(58) Field of Classification Search
CPC ..... A47J 31/60; A47J 31/3695; A47J 31/3628
See application file for complete search history.

(56) References Cited

U.S. PATENT DOCUMENTS

2006/0213928 A1    9/2006    Ufheil et al.
2010/0116142 A1    5/2010    Versini
(Continued)

FOREIGN PATENT DOCUMENTS

| CN | 101980636 A | 2/2011 |
|---|---|---|
| CN | 108289566 A | 7/2018 |

(Continued)

OTHER PUBLICATIONS

Russian Office Action for Russian Appl No. 2022117319/03 dated Apr. 2, 2024.

*Primary Examiner* — Reginald Alexander
(74) *Attorney, Agent, or Firm* — Thorpe North & Western, LLP

(57) ABSTRACT

A cleaning apparatus for a beverage preparation machine comprises at least one fluid processing device comprising a fluid processing body provided with an outflow portion for the outflow of a cleaning fluid. The fluid processing body comprises at least one of the following means: inlet means for introducing a fluid substance into a container for the preparation of a beverage product by mixing of the fluid substance with an ingredient contained in the container; outlet means for allowing the outflow of the beverage product from the container once the fluid substance is introduced into the container and is mixed with the ingredient. The cleaning apparatus further comprises a cleaning device comprising a cleaning body, which in turn comprises one or more movable elements defining a chamber for housing at least a portion of the fluid processing body, and movement means for moving the one or body are dimensioned and shaped such that, in the active position, the one or more movable elements enclose at least a portion of the fluid processing body in the chamber, such that the cleaning fluid can circulate in a space between the fluid processing body and the one or more movable elements when said (Continued)

cleaning fluid is ejected from the outflow portion of the fluid processing body. In the inactive position the one or more movable elements are moved away from the fluid processing body, such that the fluid processing body and the container can be functionally connected together for the preparation of the beverage product and/or the outflow of the beverage product.

20 Claims, 23 Drawing Sheets

(56) References Cited

U.S. PATENT DOCUMENTS

| | | |
|---|---|---|
| 2012/0087203 A1 | 4/2012 | Williams et al. |
| 2012/0192720 A1 | 8/2012 | Cesaro |
| 2015/0129003 A1* | 5/2015 | Lin .................. A47J 31/60 |
| | | 134/166 C |
| 2015/0216351 A1 | 8/2015 | Vanni et al. |
| 2023/0180963 A1* | 6/2023 | Rivera ............ A47J 31/4403 |
| | | 99/290 |

FOREIGN PATENT DOCUMENTS

| | | | |
|---|---|---|---|
| EP | 2374733 A1 | 10/2011 | |
| EP | 2460449 | 6/2012 | |
| JP | 2013544602 A | 12/2013 | |
| RU | 2007121689 A | 12/2008 | |
| WO | WO-2009099330 A2 * | 8/2009 | ............ A47J 31/402 |
| WO | 2019096830 A1 | 5/2019 | |

* cited by examiner

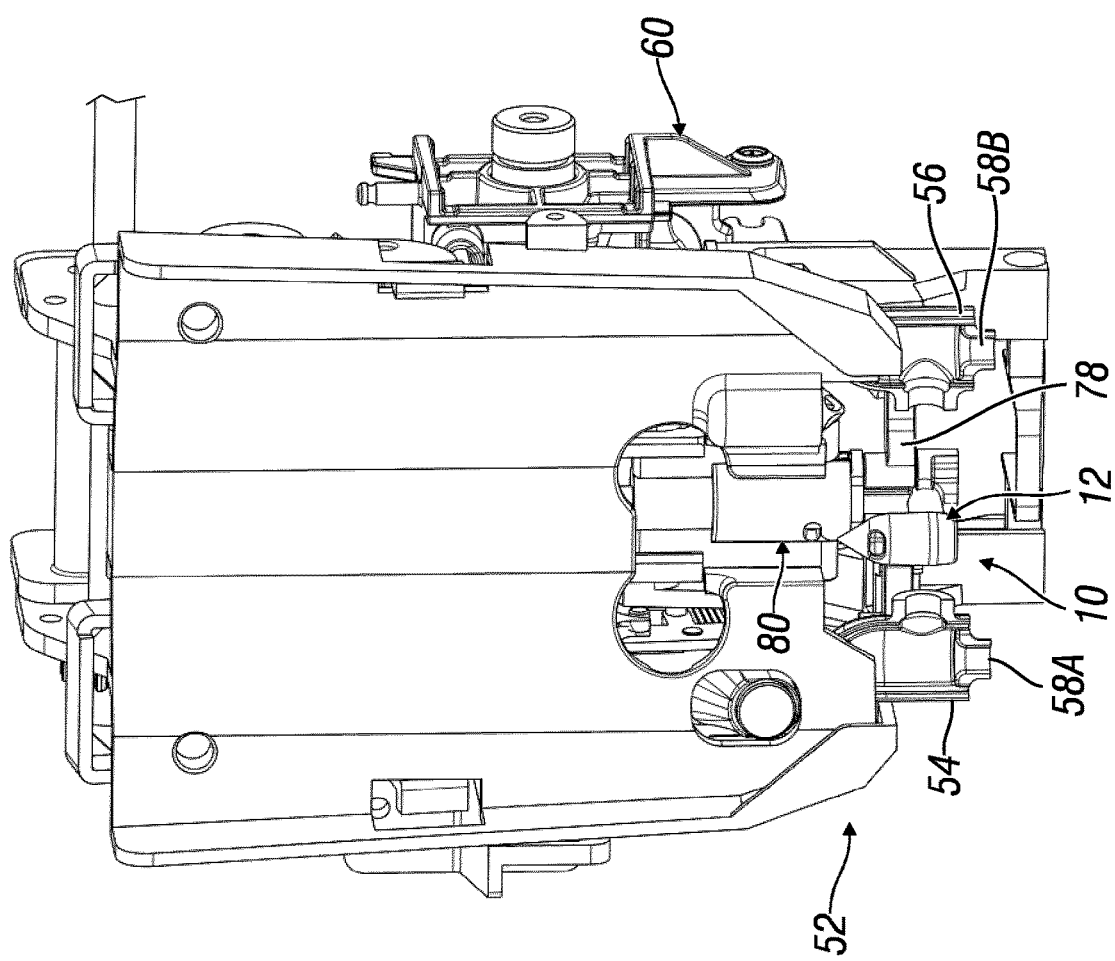

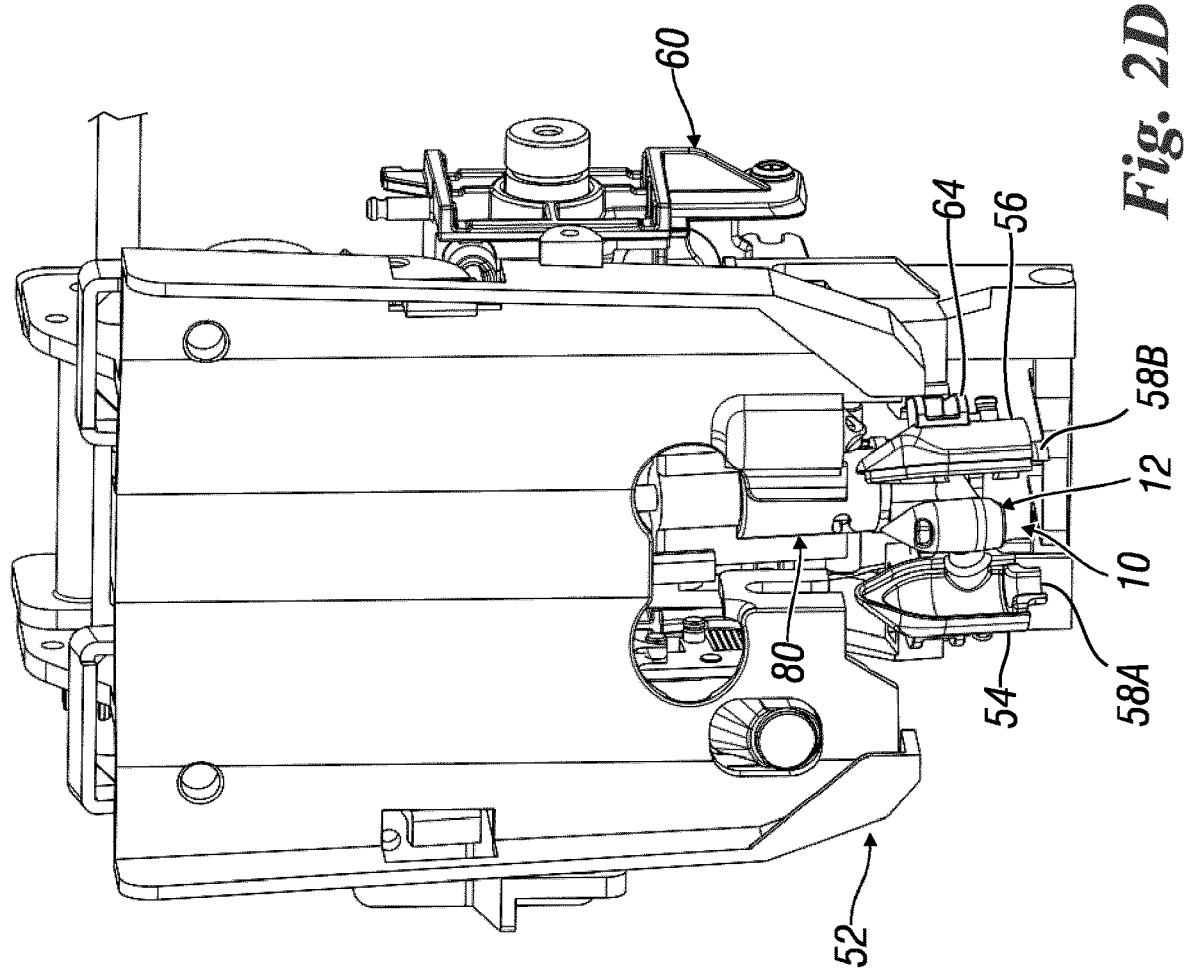

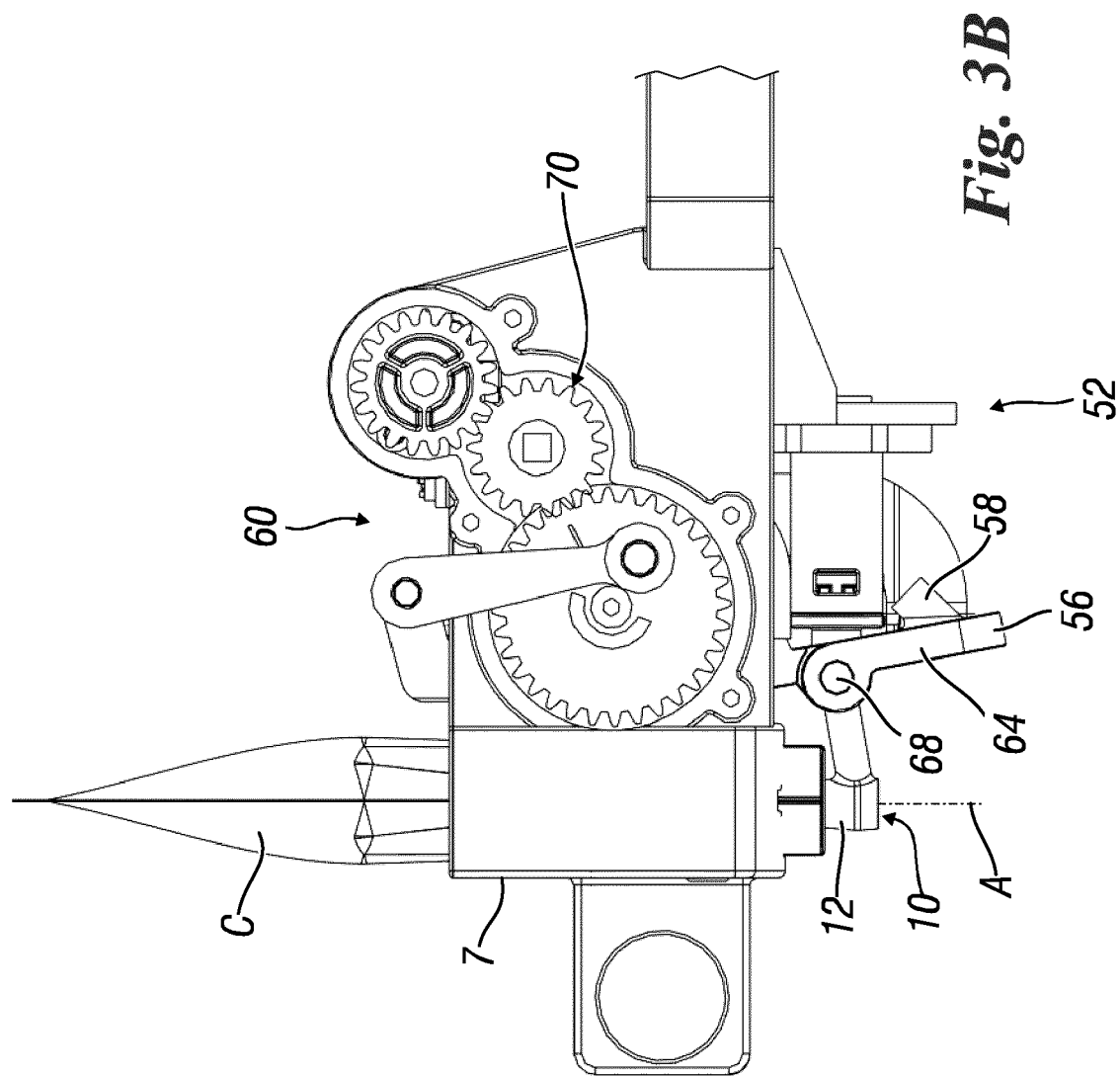

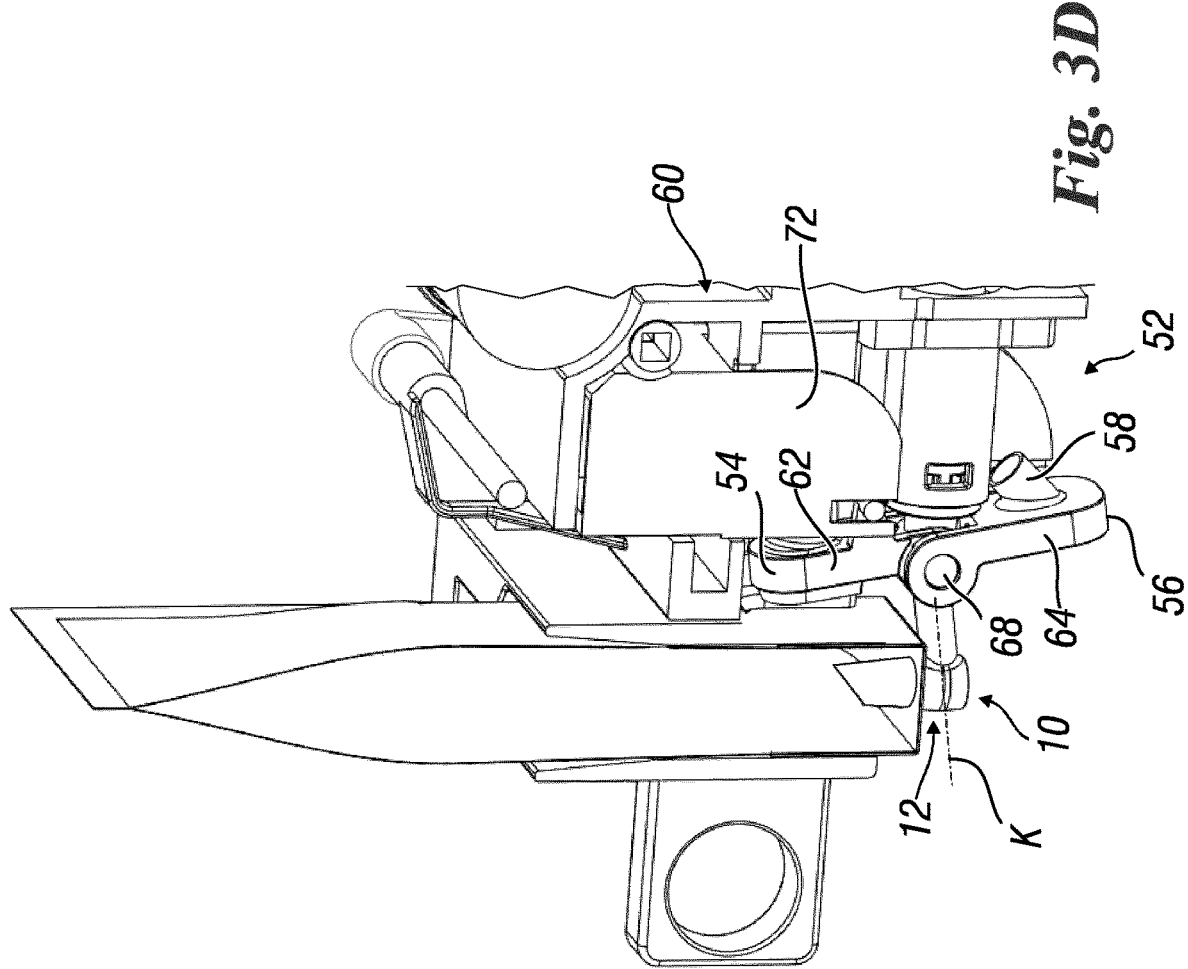

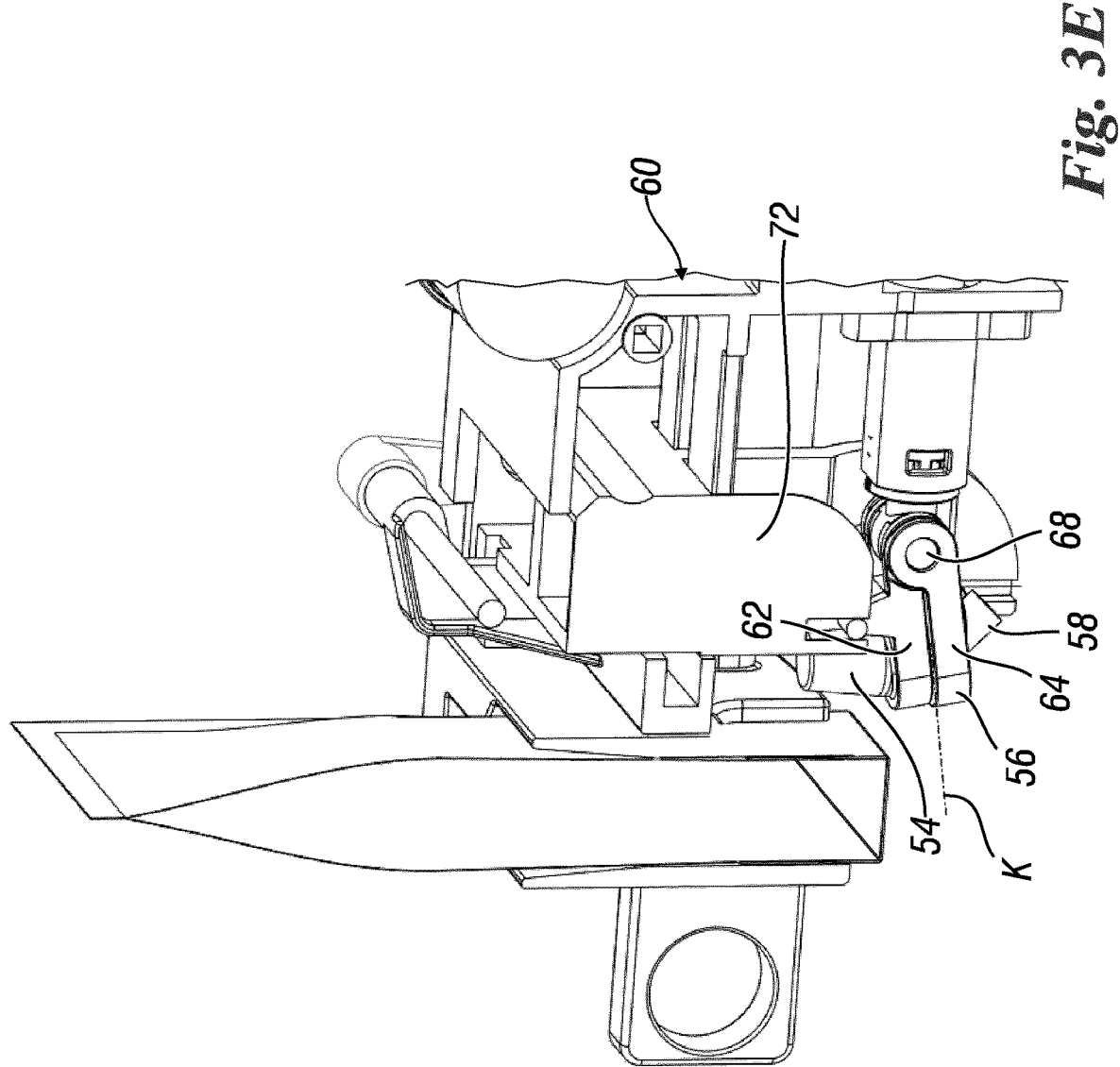

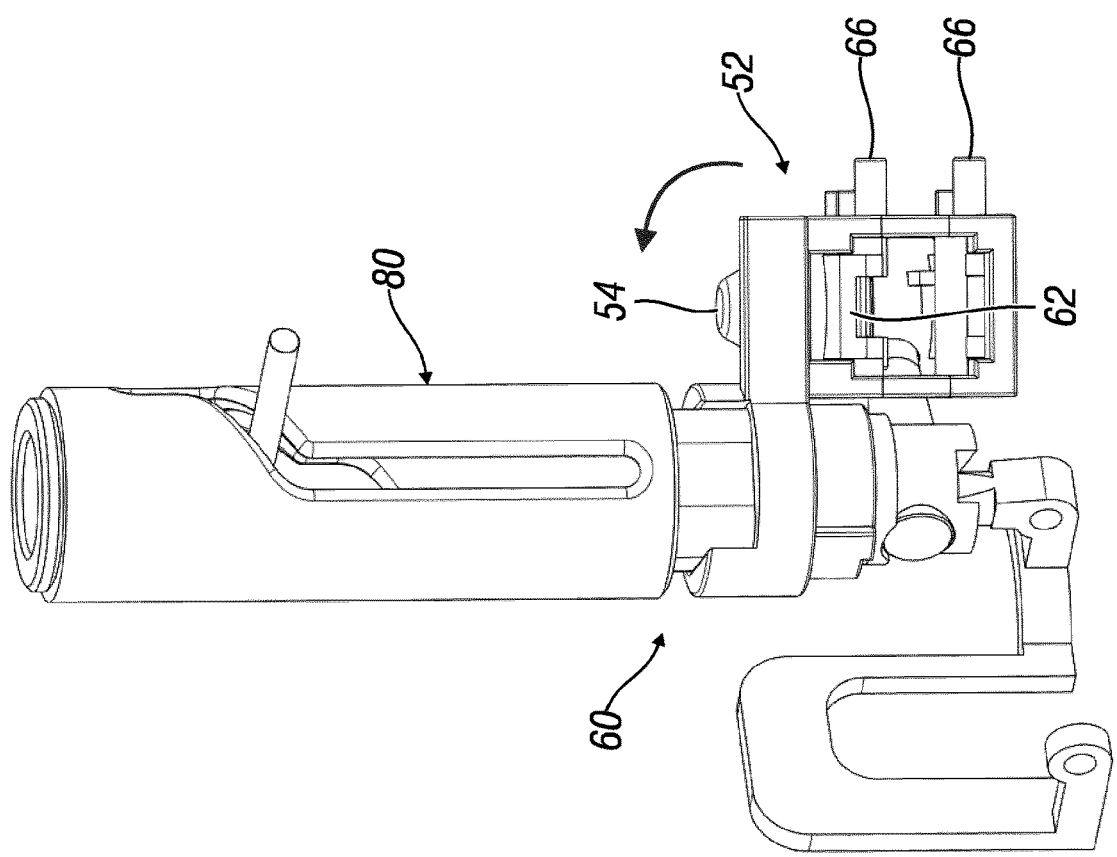

CLEANING APPARATUS FOR A BEVERAGE PREPARATION MACHINE

CROSS REFERENCE TO RELATED APPLICATIONS

The present application is a National Stage of International Application No. PCT/EP2020/084070, filed on Dec. 1, 2020, which claims priority to European Patent Application No. 19213435.1, filed on Dec. 4, 2019, the entire contents of which are being incorporated herein by reference.

FIELD OF THE INVENTION

The present invention concerns a cleaning apparatus for a beverage preparation machine, particularly a machine for preparing a beverage product by mixing a fluid substance with an ingredient contained in a container, such as e.g. a sachet.

BACKGROUND OF THE INVENTION

All known systems for in-home preparation of beverages involve a machine that receives an ingredient storage container for storing an ingredient for the preparation of a beverage product. Generally, the ingredient container is introduced in the beverage preparation machine, and the machine passes a fluid (typically hot water) through the ingredient. The beverage product prepared by mixing the ingredient and the fluid substance is then dispensed out of the container to a consumer receptacle (typically a cup).

Typically, the fluid passed from the beverage preparation machine to the container is introduced by a shower plate that is in contact with a fluid permeable side of the container. Alternatively, the beverage preparation machine comprises a fluid inlet processing device that pierces through an inlet wall of the container and injects the fluid therein (generally under a certain pressure). In such beverage preparation machines known in the art, dispensing of the beverage product from the container may be performed by piercing a dispensing wall of the container by a fluid outlet processing device of the beverage preparation machine, that is able to let the beverage product out of the container vicinity.

In the beverage preparation machines according to the prior art, the fluid inlet processing device for injecting the fluid into the container may come in contact with the ingredient. Additionally, also the fluid outlet processing device is of course in contact with the beverage product during beverage preparation. Therefore, there is the need of cleaning the fluid outlet and/or inlet processing devices (and, in general, each device of the machine that comes in contact with the ingredient contained into the container and/or with the beverage product) just after beverage preparation is finished. This cleaning operation is required after each beverage preparation cycle is finished, in order to prevent bacterial growth, and therefore guarantee a clean and safe usage to the consumer.

There is therefore a need for a cleaning apparatus for a beverage preparation machine which obviates the above cited drawbacks of existing beverage systems. What is more, it is important for consumer convenience and for guaranteeing that the cleaning process is complete and safe, that said cleaning process performed by the cleaning apparatus is automated.

SUMMARY OF THE INVENTION

The invention as claimed in claim 1 is a cleaning apparatus for a beverage preparation machine. The cleaning apparatus comprises at least one fluid processing device comprising a fluid processing body provided with an outflow portion for the outflow of a cleaning fluid. The fluid processing body comprises at least one of the following means:
 inlet means for introducing a fluid substance into a container for the preparation of a beverage product by mixing of the fluid substance with an ingredient contained in the container;
 outlet means for allowing the outflow of the beverage product from the container once the fluid substance is introduced into the container and is mixed with the ingredient.

The cleaning apparatus further comprises a cleaning device comprising a cleaning body, comprising in turn one or more movable elements defining a chamber for housing at least a portion of the fluid processing body, and movement means, for moving the one or more movable elements between an active position and an inactive position.

The one or more movable elements and the fluid processing body are dimensioned and shaped such that, in the active position, the one or more movable elements enclose at least a portion of the fluid processing body in the chamber, such that the cleaning fluid can circulate in a space between the fluid processing body and the one or more movable elements when said cleaning fluid is ejected from the outflow portion of the fluid processing body. In the inactive position the one or more movable elements are moved away from the fluid processing body, such that the fluid processing body and the container can be functionally connected together for the preparation of the beverage product and/or the outflow of the beverage product.

In a highly preferred embodiment of the invention, the fluid processing body comprises both the inlet means for introducing the fluid substance into the container and the outlet means for allowing the outflow of the beverage product from the container.

In a preferred embodiment of the invention, the cleaning body is provided with at least two movable elements which define the chamber. The movement means thus comprise a motorized actuation system for automatically moving the two movable elements relatively one to another between at least one of the active position, wherein the two movable elements are connected together and define the chamber, and the inactive position, wherein the two movable elements are moved away one to another and open the chamber, and vice versa.

Advantageously, the cleaning device is provided with at least one outlet for discharging the cleaning fluid. Preferably, the outlet consists of a conduit provided on at least one of the movable elements.

In a preferred embodiment of the invention, both the fluid processing body and each movable element are connected to a base portion, whereas the movement means comprise one or more actuation arms for connecting each movable element to the base portion. More preferably, the base portion is provided with a coupling portion, arranged for removably coupling the base portion to the beverage preparation machine, and with at least one inlet conduit of the cleaning fluid.

Preferably, the movement means comprise one or more actuation arms which are connected to each movable element. The actuation arms are movable between the active position and the inactive position and vice-versa.

According to a possible embodiment, the actuation arms are hinged around a respective rotation pin oriented along a substantially vertical axis, such that each movable element is rotated on a substantially horizontal plane between the active position and the inactive position and vice-versa.

According to another possible embodiment, the actuation arms are hinged around a respective rotation pin oriented along a substantially horizontal axis, such that each movable element is rotated on a substantially vertical plane between the active position and the inactive position and vice-versa.

According to a further possible embodiment, the actuation arms are hinged around a respective rotation pin oriented along a first axis, preferably a substantially horizontal axis, such that each movable element is rotated between the active position and the inactive position and vice-versa, whereas the fluid processing device too is rotatable around a second axis, preferably a substantially vertical axis, to selectively engage and disengage with the cleaning device.

Preferably, in these embodiments the motorized actuation system can comprise a gear mechanism, wherein a sliding transmission device is interposed between each movable element and the gear mechanism. The sliding transmission device is connected, at one end thereof, to at least one of the actuation arms and, at the opposite end thereof, to the gear mechanism for moving each movable element between at least one of the active position and the inactive position and vice-versa.

Preferably, in these embodiments the movement means can further comprise at least one elastic element that maintains the movable elements in the inactive position, wherein the motorized actuation system comprises a cam mechanism provided with at least one pusher element interposed between the movable elements. The cam mechanism is actuated by the motorized actuation system for pushing the movable elements against the pusher elements, opposing the elastic force of the elastic element, to obtain the active position.

According to a preferred aspect of the invention, the movable elements are shell-shaped, and the outer surface of the fluid processing body has a shape that is substantially identical to the shape of the internal surface of the movable elements. The average distance between the outer surface of the fluid processing body and the internal surface of the movable elements, in the active position, is preferably less than 5 mm, more preferably less than 3 mm, and even more preferably less than 1 mm.

According to another preferred aspect of the invention, the cleaning fluid enclosed by the movable elements, in their active position, has a volume less than 100 ml, preferably less than 50 ml, and more preferably less than 35 ml.

Additionally, also a beverage preparation machine is claimed. The beverage preparation machine comprises a fluid circulation system for a fluid substance. The fluid circulation system comprises in turn at least one fluid source, at least one fluid pump and at least one fluid circulation conduit. The beverage preparation machine further comprises at least one container holder, adapted for receiving a corresponding container, and a cleaning apparatus of the type described above. The cleaning apparatus is part of the fluid circulation system, as well as of the fluid processing device.

BRIEF DESCRIPTION OF THE DRAWINGS

Additional features and advantages of the present invention are described in, and will be apparent from, the description of the presently preferred embodiments which are set out below with reference to the drawings in which:

FIG. 2C is a perspective view of the cleaning apparatus provided with the cleaning device of FIG. 2A, wherein the cleaning apparatus is connected to a beverage preparation machine and the cleaning device is shown in an inactive or open position;

FIG. 2D is another perspective view of the cleaning apparatus provided with the cleaning device of FIG. 2A, wherein the cleaning apparatus is connected to a beverage preparation machine and the cleaning device is shown in an intermediate position;

FIG. 3B is a perspective view of the cleaning apparatus provided with the cleaning device of FIG. 3A, wherein the cleaning device is shown in an inactive or open position and a motorized actuation system of the cleaning apparatus is shown;

FIG. 3D is a detailed sectional view of FIG. 3B;

FIG. 3E is a detailed sectional view of FIG. 3C;

FIG. 4E is a perspective view of the cleaning apparatus provided with the cleaning device of FIG. 4A, wherein the cleaning apparatus is connected to a beverage preparation machine and the cleaning device is shown in an inactive or open position, with the fluid processing device ready to be cleaned;

DETAILED DESCRIPTION OF THE INVENTION

Figure 1:
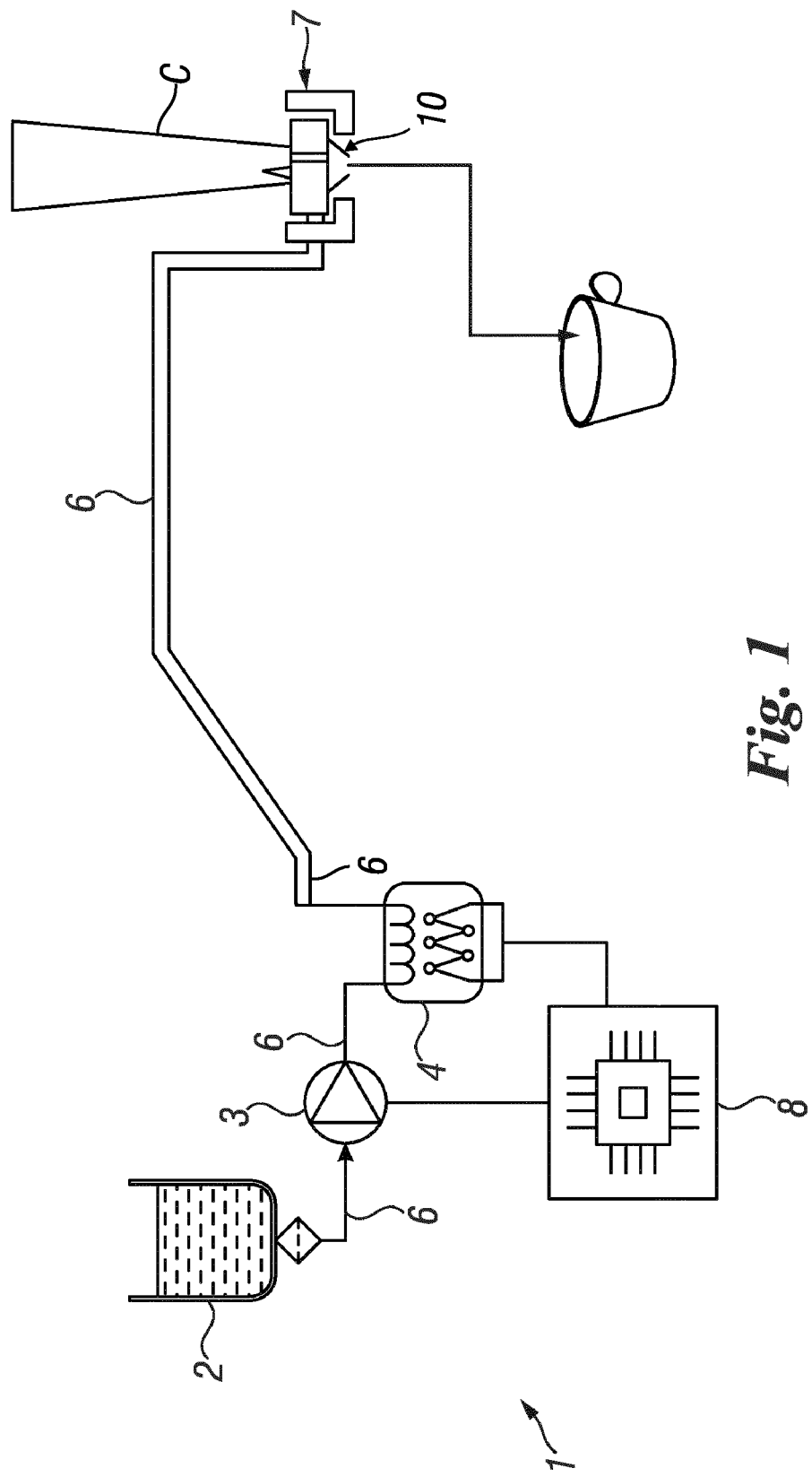
FIG. 1 is a schematic representation of a beverage preparation machine that can be provided with a cleaning apparatus according to the present invention.

FIG. 1 illustrates schematically the layout of a beverage preparation machine that can be provided with a cleaning apparatus according to the present invention.

The beverage preparation machine can be of any type known in the state of the art and is indicated as a whole with reference numeral 1. The beverage preparation machine generally comprises a fluid circulation system for a fluid substance. The fluid substance is typically water, at cold state (between 4° C. and 20° C.), ambient state (between 20° C. and 35° C.) or hot state (between 35° C. and 95° C.). Preferably, the fluid substance is water at a temperature comprised between 40° C. and 90° C.

For example, the fluid circulation system comprises at least one fluid source 2, at least one fluid pump 3 and at least one fluid circulation conduit 6. The fluid circulation system may also comprise at least one fluid heating element 4. Such fluid circulation systems are known in the state of the art. The fluid source 2 can be, for example, a detachable water reservoir that is connected to the fluid circulation system. Alternative fluid sources could comprise, for example, tap-water connections, a non-water edible fluid canister or a water-bottle connection. The fluid pump 3 can be, for example, a standard piston pump delivering a maximum output pressure of 20 bar. Obviously, alternative fluid pumps could be provided.

The beverage preparation machine 1 comprises at least one container holder 7 adapted for receiving a corresponding container C. The container holder 7 is a mechanical element adapted for ensuring the static positioning of the container C within the beverage preparation machine 1, at least during the time it actually operates for preparing a beverage, so that the corresponding fluid circulation system can be connected to the container C in a functional manner for injecting the fluid substance therein or therethrough. These container holders are known in the state of the art.

The beverage preparation machine 1 further comprises at least one fluid processing device 10 which is part of the fluid circulation system and which comprises a fluid processing body 12. FIGS. 5A-5B, 6A-6B and 7A-7B disclose three different preferred embodiments of the fluid processing device 10. In these embodiments, the fluid processing device 10 is preferably configured both for introducing the fluid substance into the container C for the preparation of the beverage product and for allowing the outflow of the beverage product from the container C once the fluid substance is introduced into the container C and is mixed with the ingredient contained therein. In addition to these two functions, the fluid processing device 10 is also configured for allowing the outflow, from a fluid processing body 12 thereof, of a cleaning fluid (preferably the same fluid introduced into the container C for the preparation of the beverage product) for cleaning said fluid processing body 12 from residues of the substance contained in the container C and/or of the beverage product.

As well known in the state of the art, the preparation of the beverage product is obtained by mixing of the fluid substance with an ingredient contained in the container C. Preferably, the ingredients are chosen within the list of roast and ground coffee, compacted or not, soluble powder coffee or leaf tea. Dairy ingredients (e.g. milk or creamer) could also be provided, as well as chocolate, fruit juices, soups, vegetable juices, bouillons, smoothies, purees, coulis, creams or a combination thereof, in powdered soluble form, liquid concentrated form having various viscosities or in gel form. With the expression "mixing of the fluid substance with an ingredient" it should be intended that all the ingredients contained in the container C are in a form which is compatible with a generic mixing operation (dissolution, extraction or infusion) with the fluid substance (typically water) to obtain the beverage product.

Preferably, the container C is a one-use container such as a pouch or a sachet or any known container having at least side walls which are flexible. The container C can also be any other openable (e.g. pierceable) closed container such as a capsule, a pod, a pad, a bottle, a flow-bag, a canister, or the like. The container C can also alternatively be a multi-dose container, having for instance a large storage compartment for storing several doses of ingredient, and a dosing and mixing chamber that is able to receive one dose at a time of ingredient that is transferred from the storage compartment.

In the embodiments of FIGS. 5A-5B, 6A-6B and 7A-7B the fluid processing device 10 preferably comprises a fluid processing body 12 provided with an inlet portion 14 and with an outlet portion 16. Preferably, the fluid processing body 12 is a needle-shaped fluid processing body 12. With the term "needle-shaped" it should be intended that the fluid processing body 12 comprises at least one end portion 26 configured for perforating, and/or piercing, and/or tearing a specific portion or wall of the container C before the introduction of the fluid substance into said container C. The fluid processing body 12 is shaped in such a way as to be able to at least partially penetrate in the container C. More specifically, the fluid processing body 12 comprises inlet means 18 (for example comprising fluid adduction ducts 18A, 18B) for introducing the fluid substance into the container C. These inlet means 18 are provided at the inlet portion 14 of the fluid processing body 12. In these embodiments, the fluid processing body 12 also comprises at least one outlet means 20 (for example comprising fluid outflow ducts 20A and/or fluid outflow surfaces 20B) for dispensing and guiding, for example into a user's cup placed below the fluid processing body 12, the beverage product from the container C at the outlet portion 16 of said fluid processing body 12.

Figure 5B:
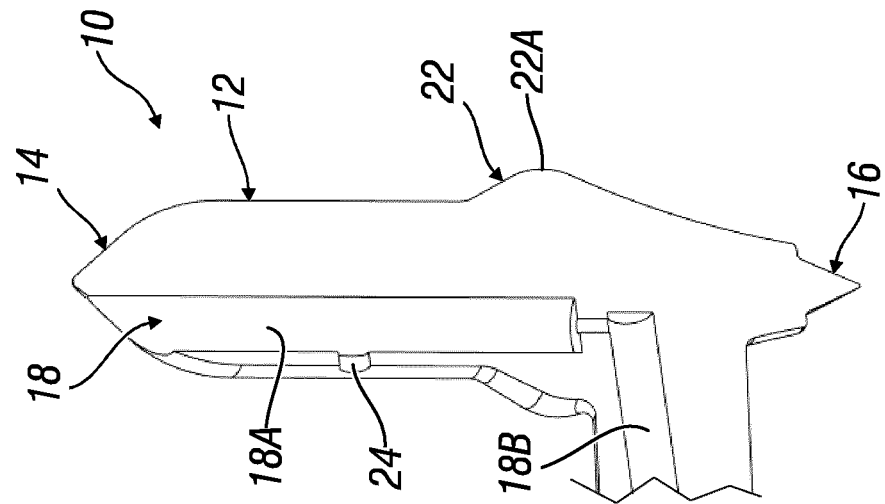
FIG. 5B is a cross-sectional view of the fluid processing device of FIG. 5A.
Figure 5A:
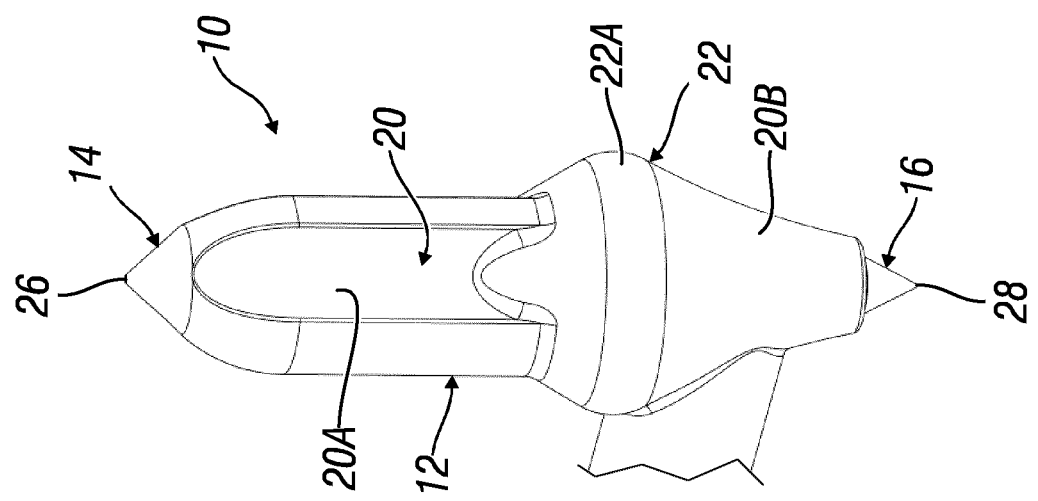
FIG. 5A is a perspective view of a first embodiment of a fluid processing device of the cleaning apparatus according to the present invention.
Figure 6B:
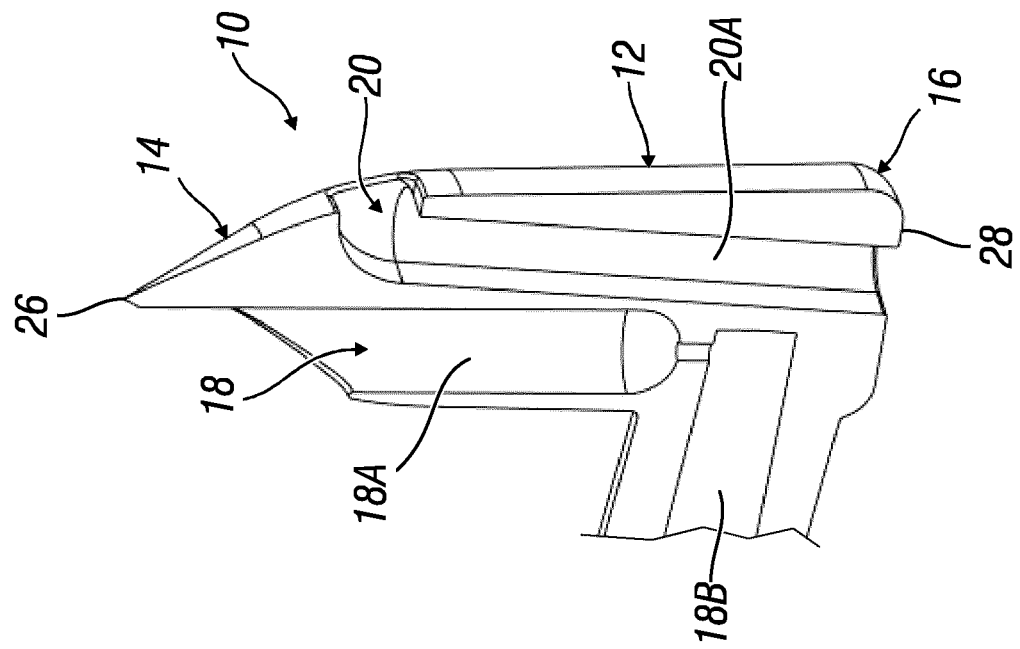
FIG. 6B is a cross-sectional view of the fluid processing device of FIG. 6A.
Figure 6A:
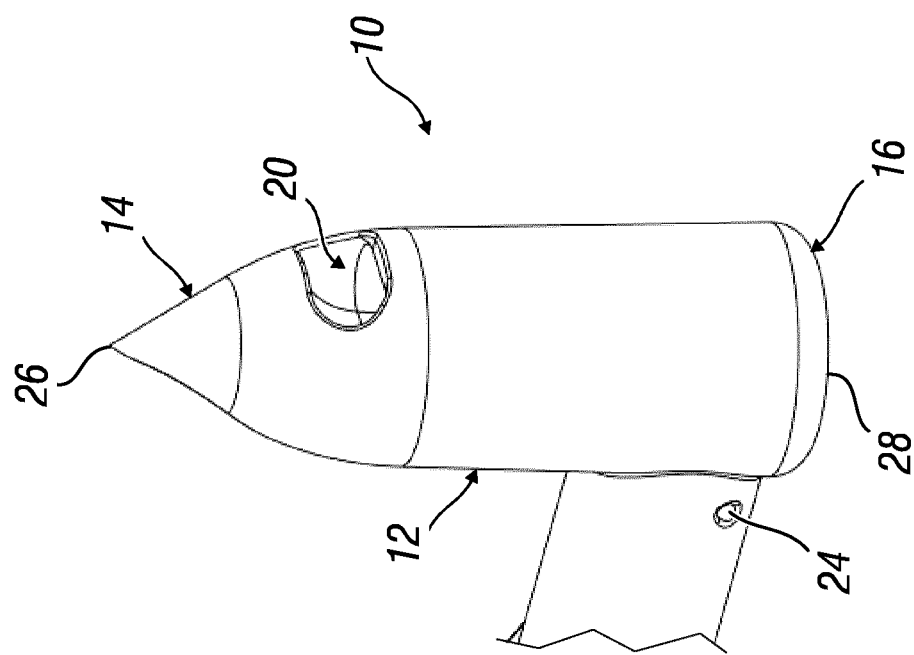
FIG. 6A is a perspective view of a second embodiment of a fluid processing device of the cleaning apparatus according to the present invention.
Figure 7B:
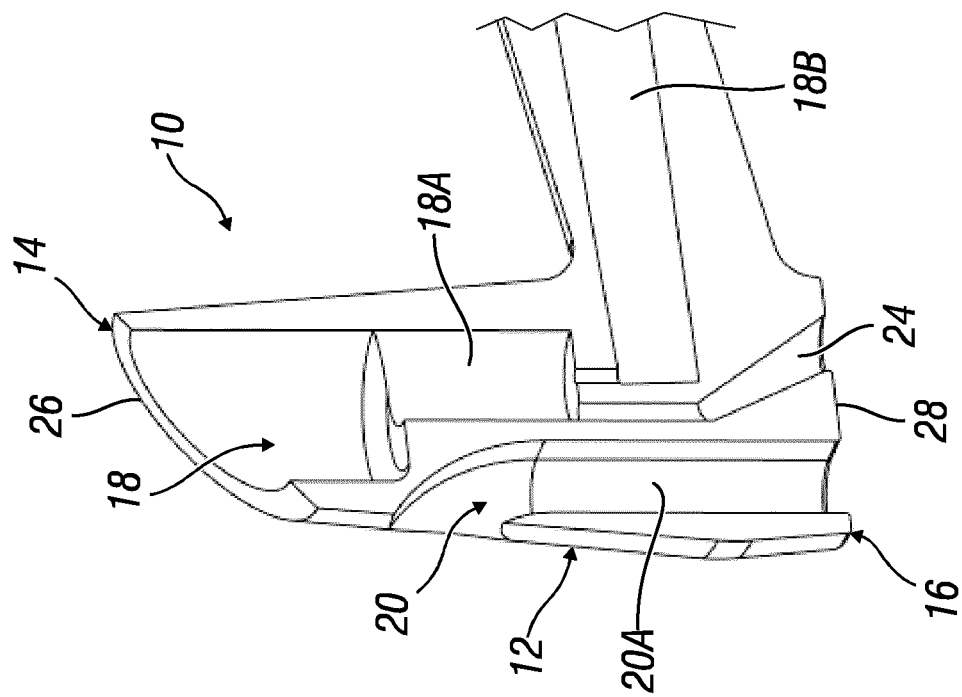
FIG. 7B is a cross-sectional view of the fluid processing device of FIG. 7A.
Figure 7A:
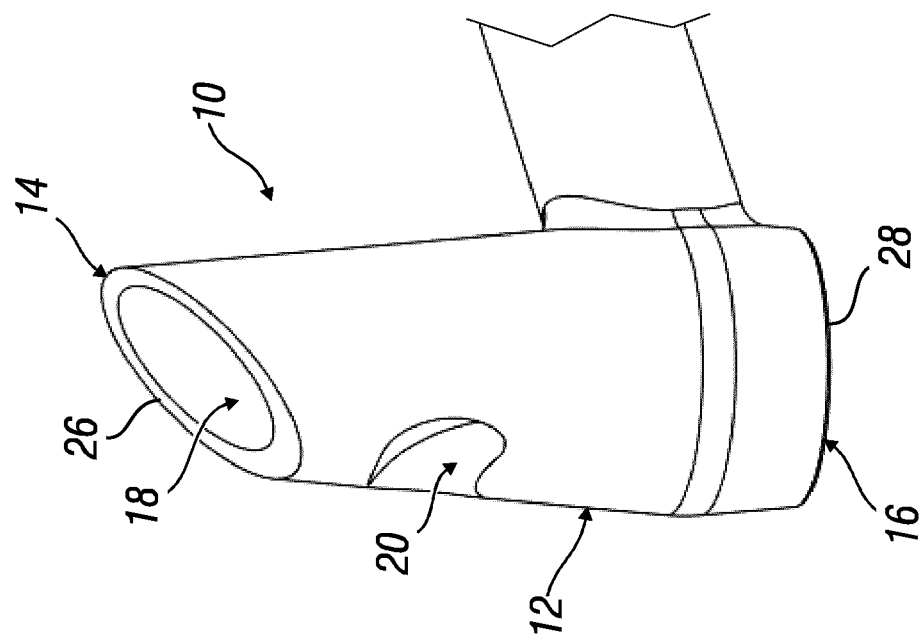
FIG. 7A is a perspective view of a third embodiment of a fluid processing device of the cleaning apparatus according to the present invention.

According to the embodiment of FIGS. 5A-5B, the fluid processing body 12 could be further provided with at least one sealing means 22 to be engaged with the container C for preventing leakage of the fluid substance and/or the beverage product from said container C in an operative condition of the fluid processing device 10, i.e. at least when first the inlet portion 14 and then the fluid substance is introduced into the container C. Preferably, in this embodiment, the sealing means 22 consists of an enlarged portion 22A of the fluid processing body 12. More specifically, this enlarged portion 22A of the fluid processing body 12 is comprised between a first end portion 26 and a second end portion 28 of the fluid processing body 12 and has a cross-sectional area which is larger than any cross-sectional areas of the portion of said fluid processing body 12 comprised between its first end portion 26 and the enlarged portion 22A itself.

According to the embodiments of FIGS. 6A-6B and 7A-7B, no specific sealing means are provided on the outer surface of the fluid processing body 12. However, a certain sealing function can be performed by a specific portion (not necessarily an "enlarged" portion) of the outer surface of the fluid processing body 12 located below the inlet means 18. If provided, also this specific portion of the outer surface of the fluid processing body 12 can be configured for adhering against a wall of the container C at the portion of said container C opened by the first end portion 26 of the fluid processing body 12. Preferably, in the embodiments of FIGS. 6A-6B and 7A-7B, no sealing means 22 of any kind are provided between the fluid processing body 12 and the container C, with the result of a small or negligible leakage of fluid substance that falls into the user's cup during beverage preparation.

Optionally, the fluid processing device 10 could be provided with at least one air or gas inlet bore 24, which is in fluid communication with the inlet means 18 and which, in the embodiment of FIGS. 5A-5B, is located on the fluid processing body 12 between the first end portion 26 and the sealing means 22. According to the embodiment shown in FIGS. 5A-5B, the air or gas inlet bore 24 is in the form of a through hole obtained on a side wall of the fluid processing body 12 and is placed in fluid communication with the inlet means 18 (and in particular with the fluid adduction duct 18A) for the fluid adduction. The air or gas inlet bore 24 allows the inlet means 18 to be in contact with the outer environment in certain operation conditions of the fluid processing device 10 and allows the aspiration of a predefined amount of air or gas, to be mixed with the fluid substance and to be introduced into the container C through the inlet means 18, by means of the Venturi effect.

In the embodiment of FIGS. 5A-5B the optional gas inlet bore 24 can be positioned on the fluid processing device 10 in such a way that, when the the inlet portion 14 is introduced into the container C at least in certain positions of the inlet portion 14, also this gas inlet bore 24 is inside the container C, without any Venturi effect. In the embodiments of FIGS. 6A-6B and 7A-7B the optional gas inlet bore 24 can be positioned on the fluid processing device 10 in such a way that it remains always outside the container C, with a Venturi effect.

According to the invention, in all the three embodiments of the fluid processing body 12, the latter is provided with an outflow portion 14 for the outflow of a cleaning fluid (typically water). In addition to its function of introducing a fluid substance into the container C for the preparation of the beverage product, the fluid processing device 10 is also configured for allowing the outflow of a cleaning fluid from the same inlet portion 14 provided for the outflow of the fluid for the preparation of the beverage, when, as discussed below, the cleaning device 52 is in a cleaning position.

According to a further embodiment (not shown) of the invention, the fluid processing device 10 may comprise only an inlet fluid processing device, or only an outlet fluid processing device, these inlet and outlet fluid processing device being separate and distinct. The inlet fluid processing device can be of a known type in the state of the art and comprises at least one fluid processing body which operates as an inlet means for introducing the fluid substance into the container C for the preparation of a beverage product by mixing of the fluid substance with an ingredient contained in the container C. The outlet fluid processing device must also be provided with a cleaning fluid inlet portion. This outlet fluid processing device may be for example of the same type as the fluid processing devices 10 described in FIGS. 5-7, thus provided with its own fluid processing body, but this outlet fluid processing device operates only as a device for allowing the outflow of the beverage product from the container C once the fluid substance is introduced therein (by another separate and distinct inlet processing device) and is mixed with the ingredient contained therein. Obviously, this outlet fluid processing device also operates as a cleaning device for its own components. Preferably, also each of the distinct and separate inlet and outlet processing devices comprises a fluid processing body which is needle-shaped. Additionally, each needle-shaped fluid processing body of the respective inlet and/or outlet processing device can comprise at least one end portion configured for perforating, and/or piercing, and/or tearing a specific portion or wall of the container C and for at least partially penetrating inside the container.

Figure 2A:
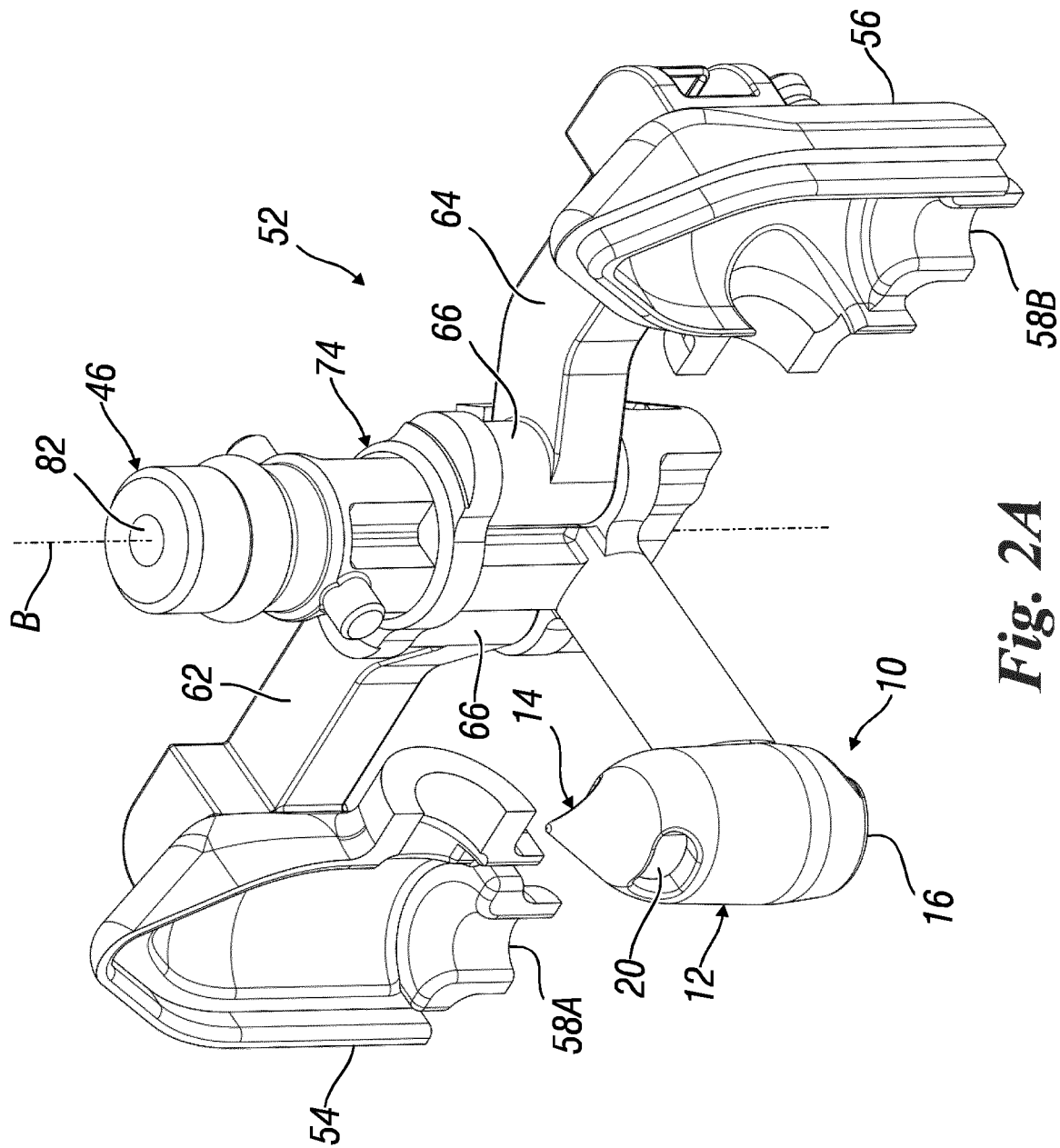
FIG. 2A is a perspective view of a first embodiment of a cleaning device of the cleaning apparatus according to the present invention, wherein the cleaning device is shown in an inactive or open position.
Figure 2B:
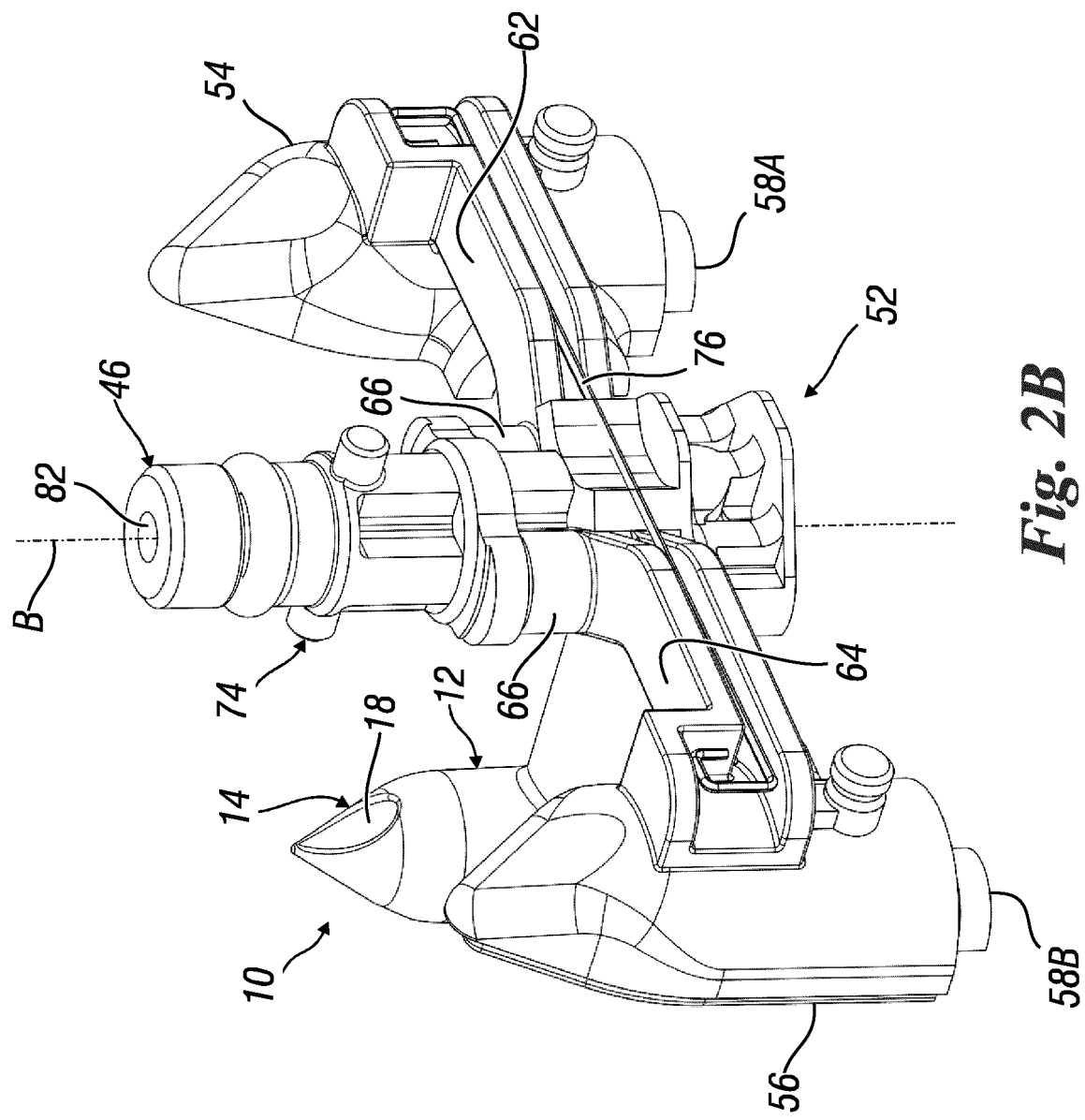
FIG. 2B is another perspective view of the cleaning device of FIG. 2A.
Figure 2E:
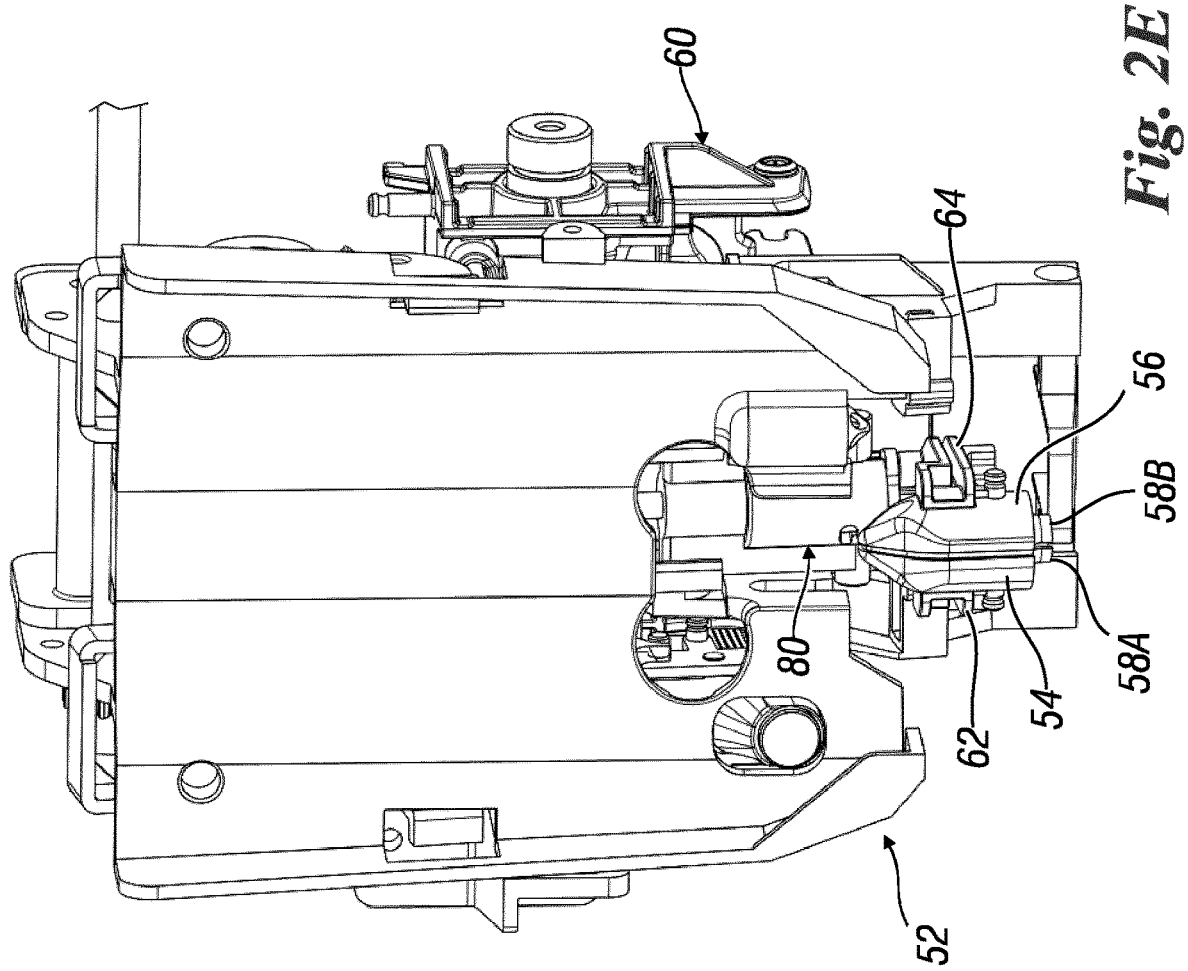
FIG. 2E is a further perspective view of the cleaning apparatus provided with the cleaning device of FIG. 2A, wherein the cleaning apparatus is connected to a beverage preparation machine and the cleaning device is shown in an active or closed position.
Figure 2F:
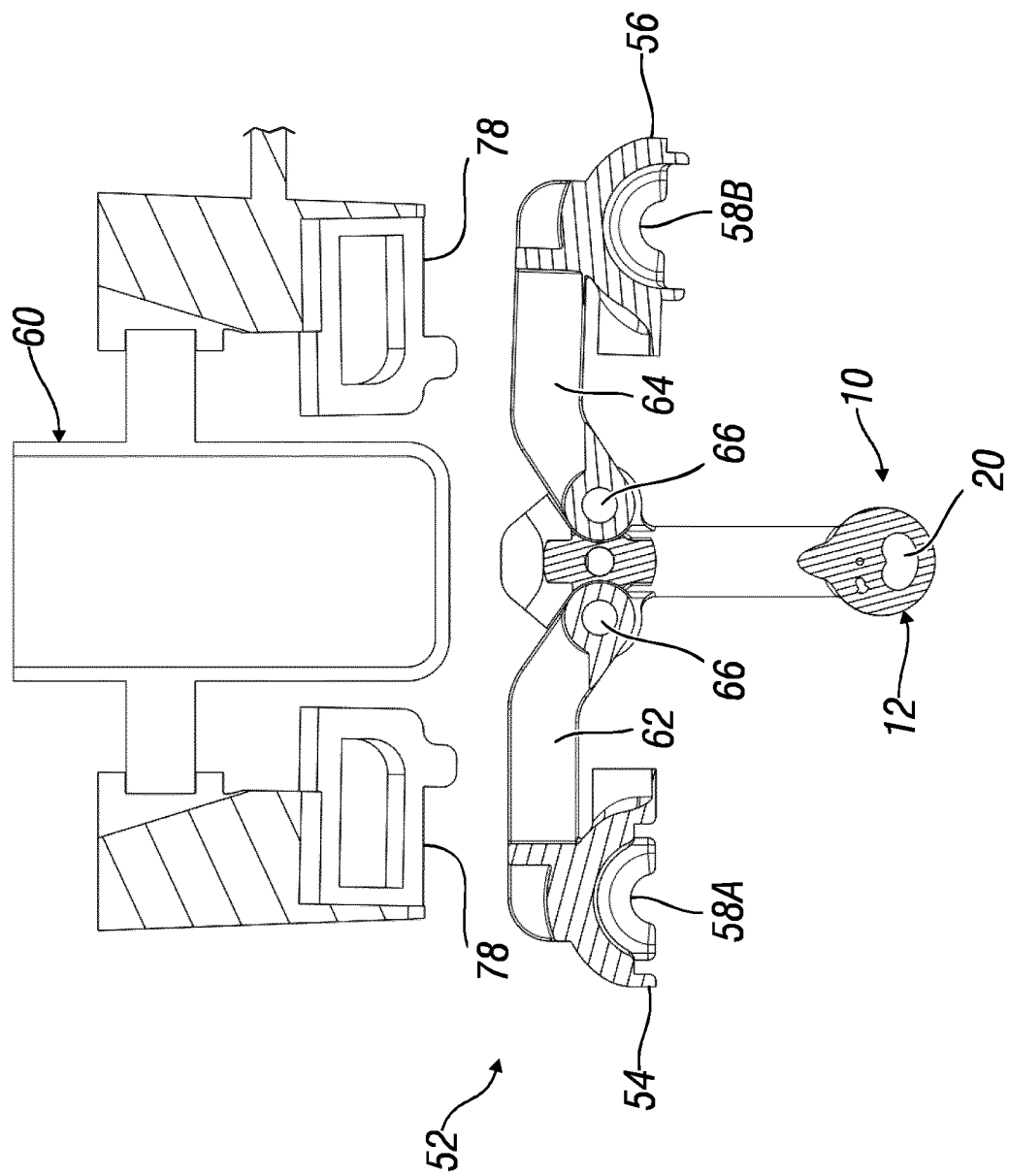
FIG. 2F is a sectional view of the cleaning apparatus provided with the cleaning device of FIG. 2A, wherein the cleaning apparatus is connected to a beverage preparation machine and the cleaning device is shown in an inactive or open position.
Figure 2G:
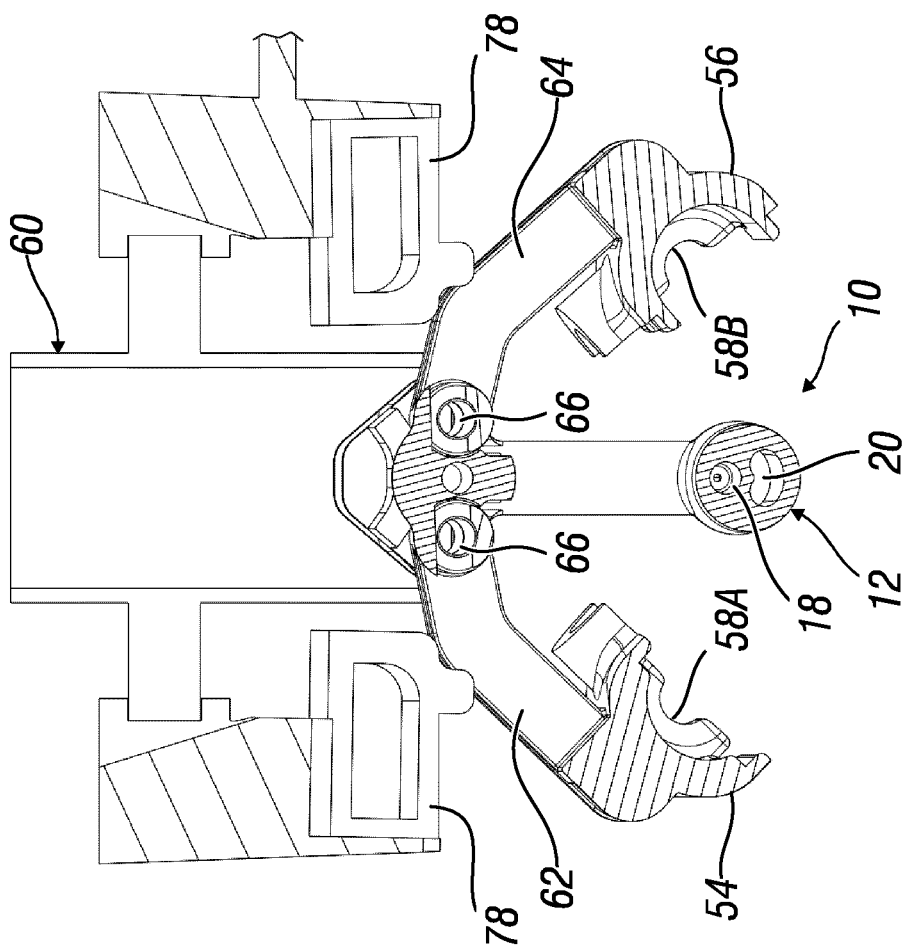
FIG. 2G is a sectional view of the cleaning apparatus provided with the cleaning device of FIG. 2A, wherein the cleaning apparatus is connected to a beverage preparation machine and the cleaning device is shown in an intermediate position.
Figure 2H:
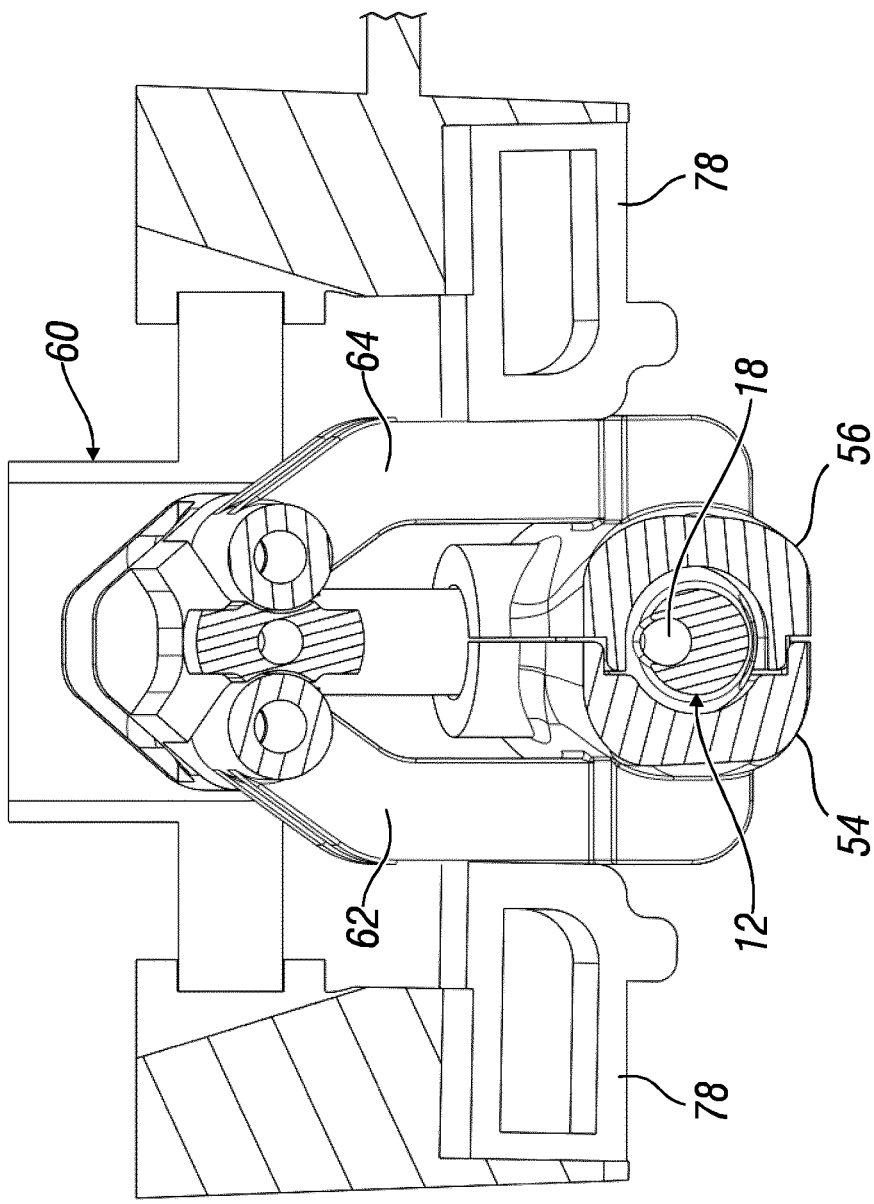
FIG. 2H is a sectional view of the cleaning apparatus provided with the cleaning device of FIG. 2A, wherein the cleaning apparatus is connected to a beverage preparation machine and the cleaning device is shown in an active or closed position.
Figure 3A:
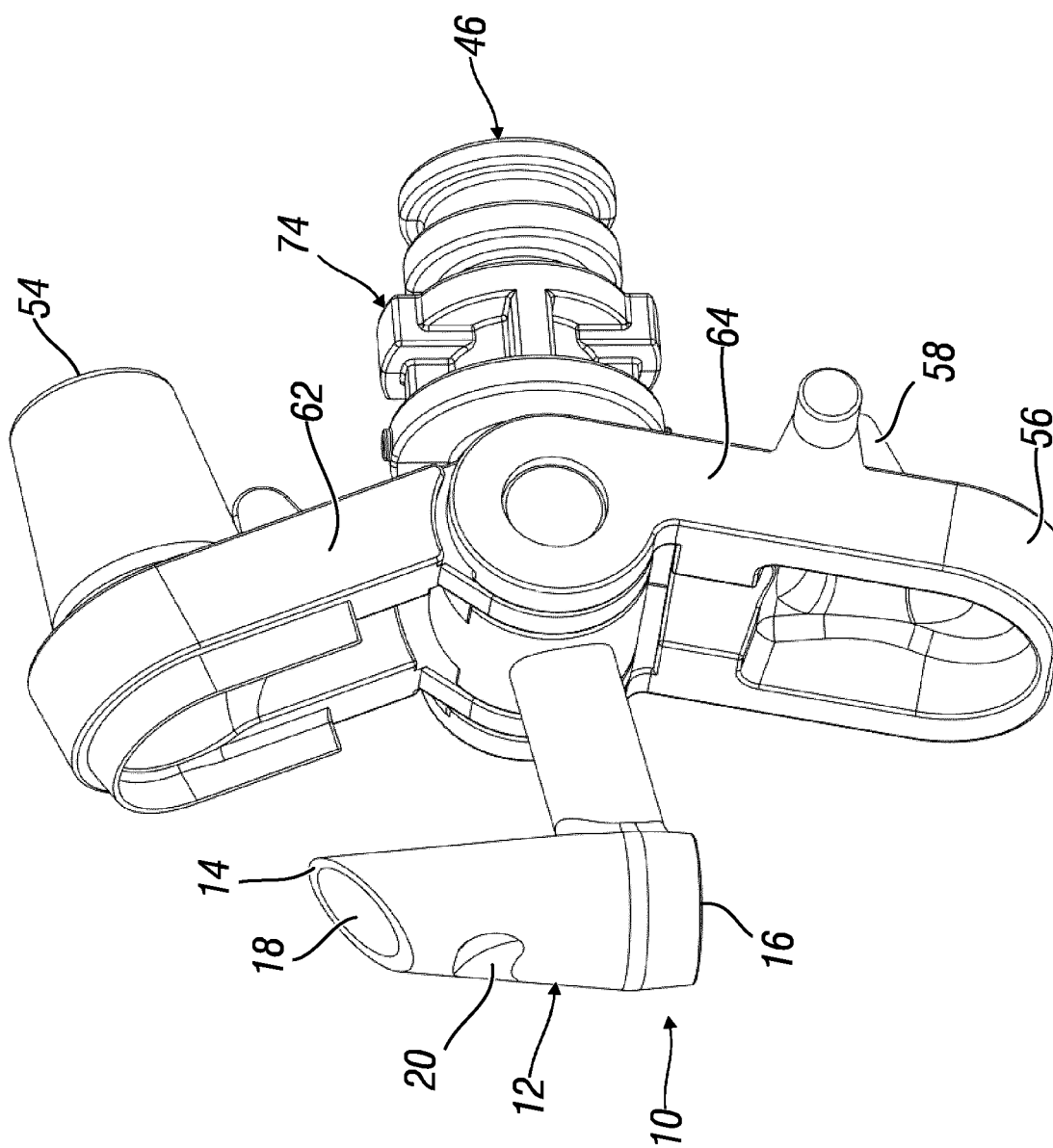
FIG. 3A is a perspective view of a second possible embodiment of a cleaning device of the cleaning apparatus according to the present invention, wherein the cleaning device is shown in an inactive or open position.
Figure 3C:
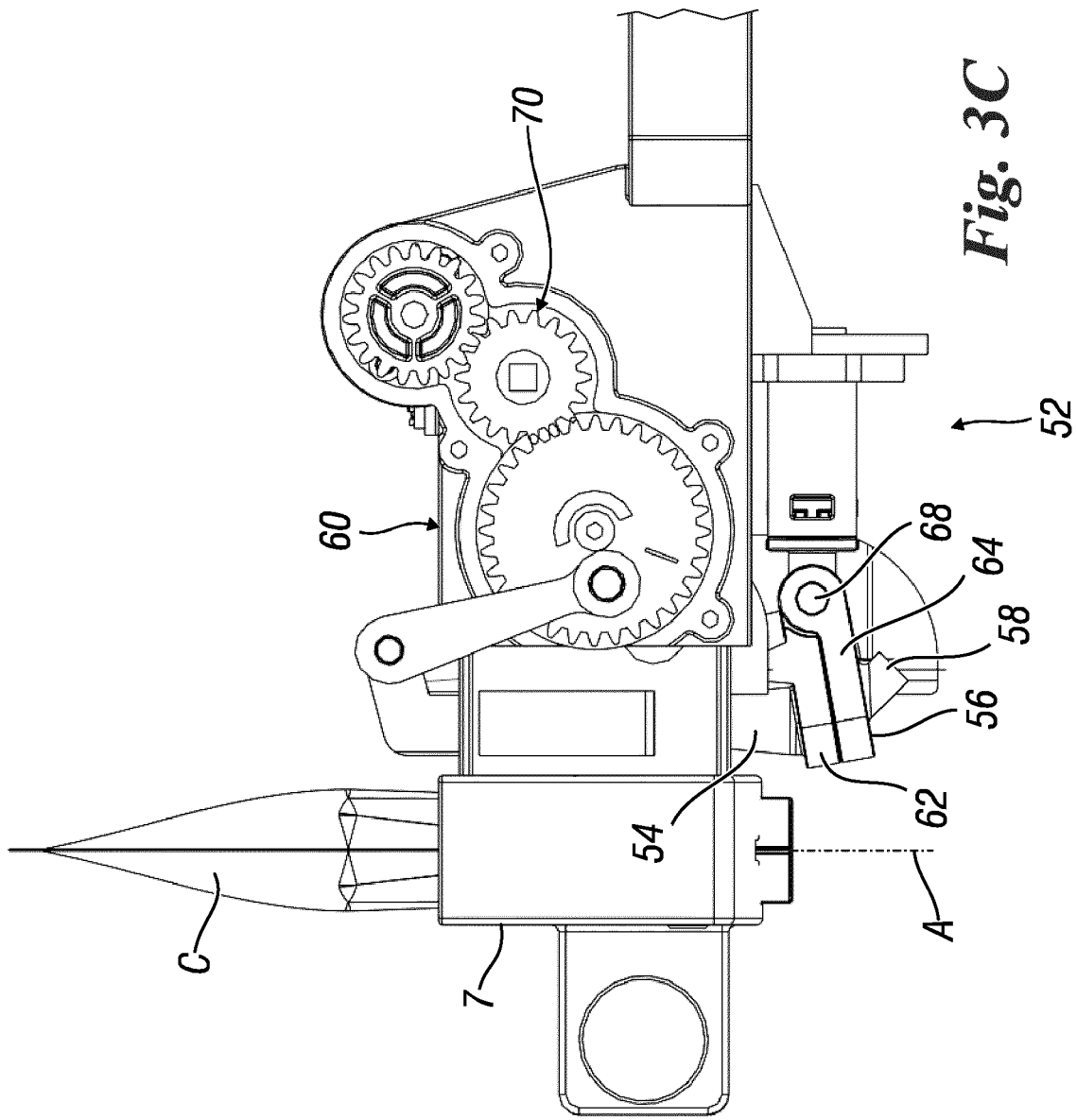
FIG. 3C is a perspective view of the cleaning apparatus provided with the cleaning device of FIG. 3A, wherein the cleaning device is shown in an active or closed position and a motorized actuation system of the cleaning apparatus is shown.
Figure 4A:
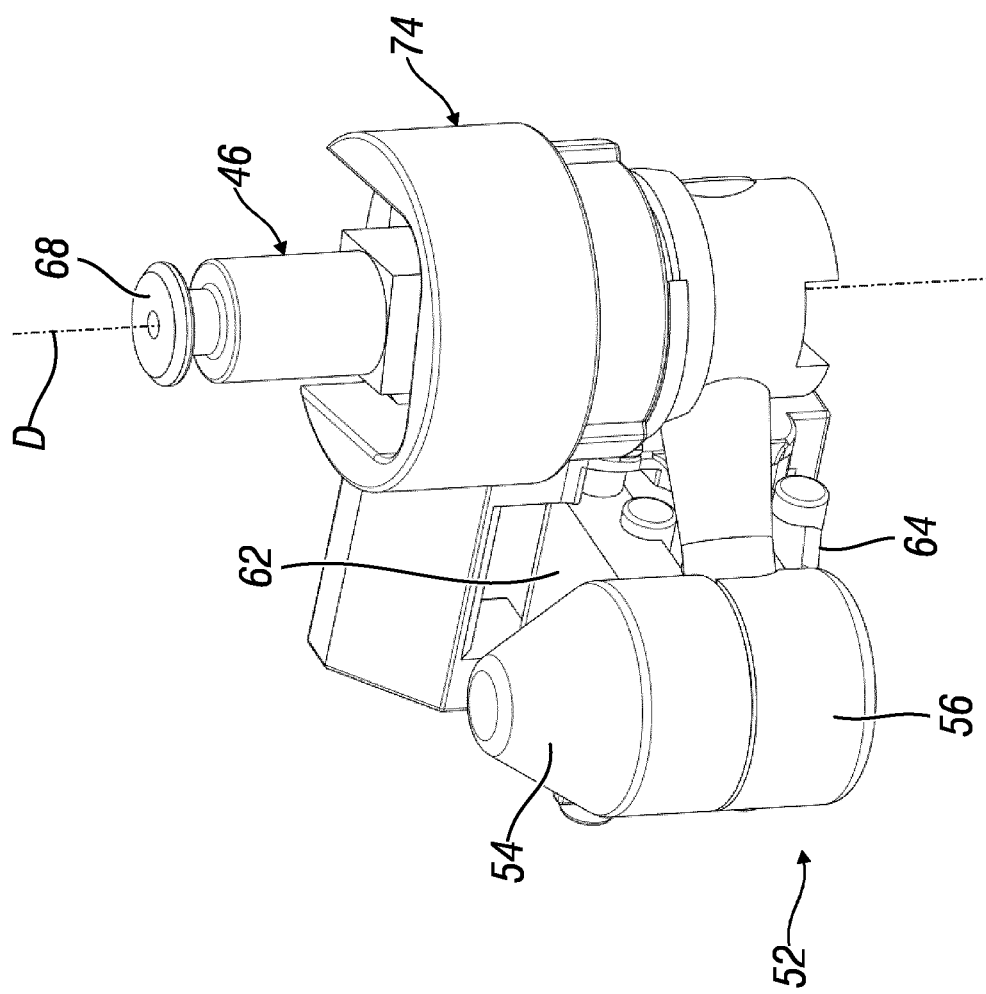
FIG. 4A is a perspective view of a third possible embodiment of a cleaning device of the cleaning apparatus according to the present invention, wherein the cleaning device is shown in an active or closed position.
Figure 4B:
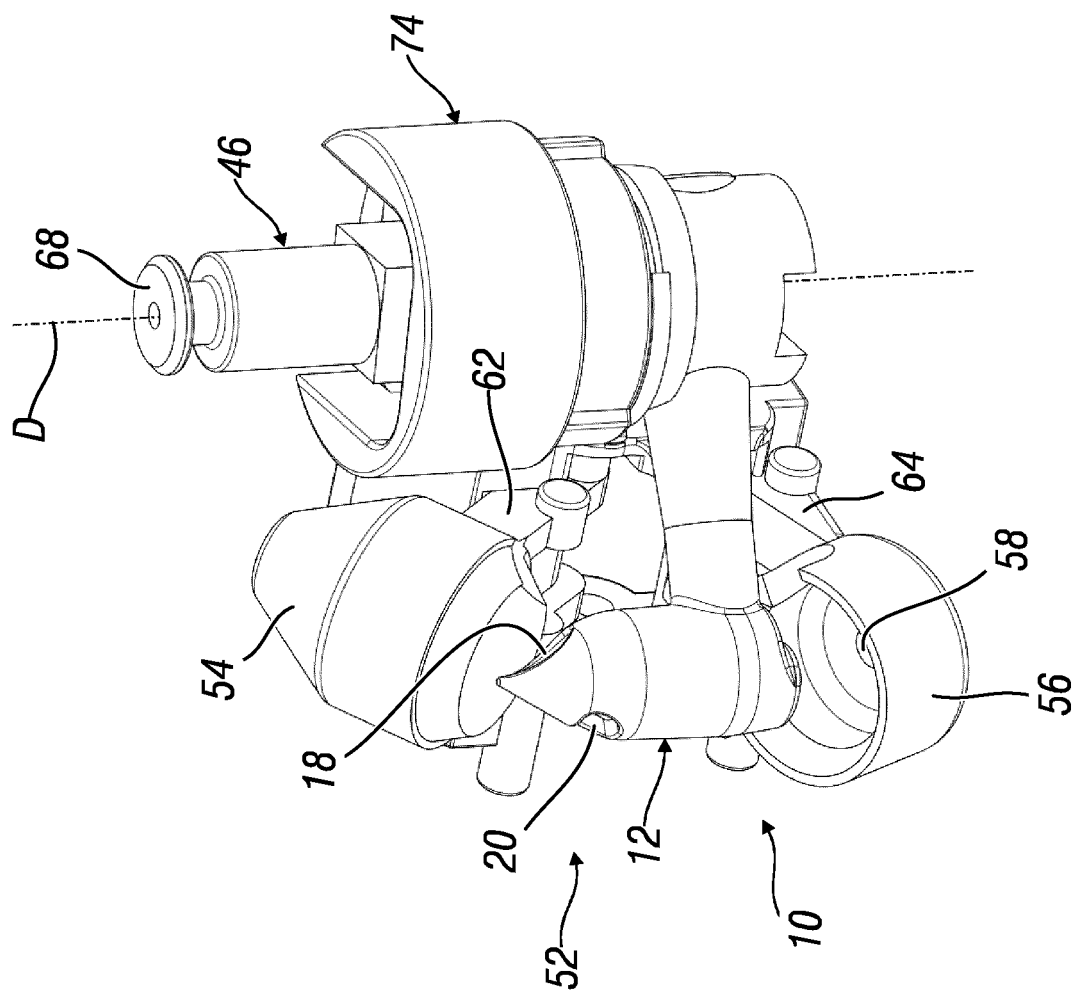
FIG. 4B is a perspective view of the cleaning device of FIG. 4A, wherein the cleaning device is shown in an inactive or open position, with the fluid processing device ready to be cleaned.
Figure 4C:
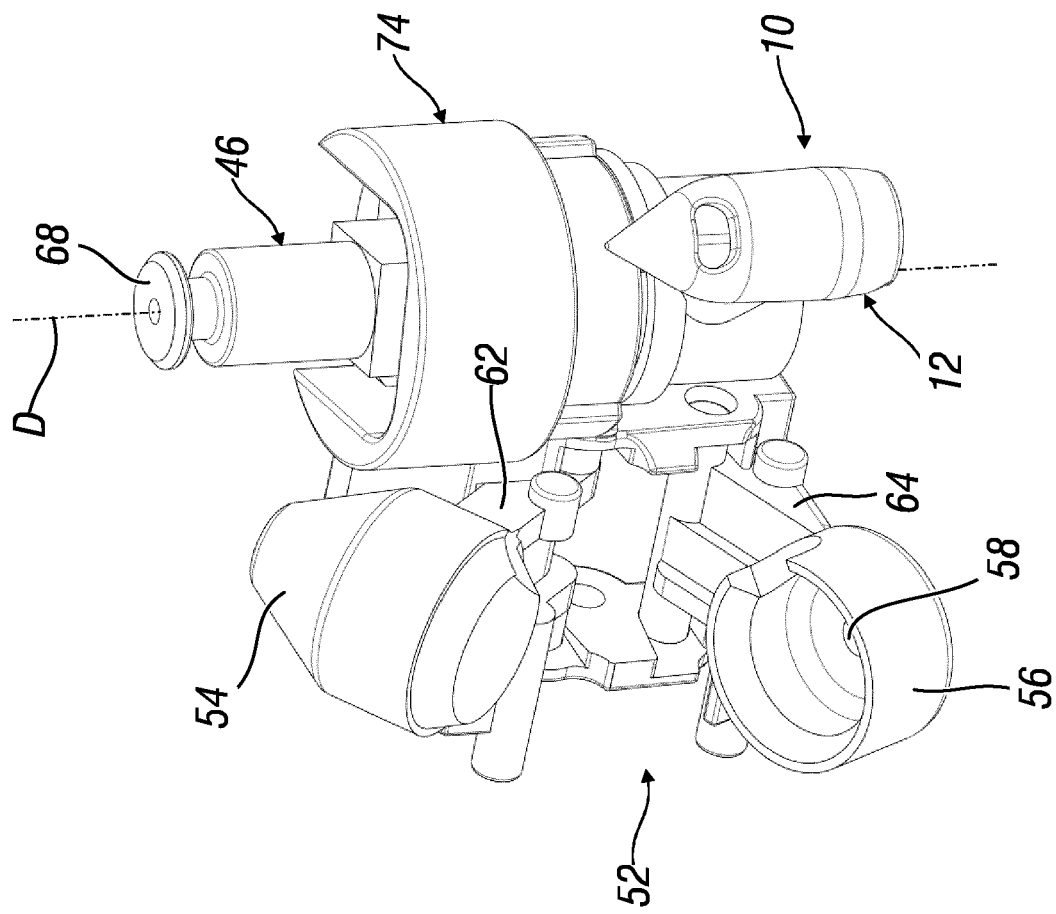
FIG. 4C is a perspective view of the cleaning device of FIG. 4A, wherein the cleaning device is shown once again in an inactive or open position, but with the fluid processing device ready for the introduction inside the ingredient storage container.

According to the invention, the cleaning apparatus comprises a cleaning device 52 comprising in turn a cleaning body comprising one or more movable elements 54, 56 defining a chamber for housing at least a portion of the fluid processing body 12. The cleaning device 52 also comprises movement means 60; 62, 64, 66; 76 for moving the one or more movable elements 54, 56 between an active position and an inactive position. The one or more movable elements 54, 56 and the fluid processing body 12 are dimensioned and shaped such that:

in the active position (FIGS. 2E, 3C and 4A), the one or more movable elements 54, 56 enclose at least a portion of the fluid processing body 12 in the chamber, such that the cleaning fluid can circulate in a space between the fluid processing body 12 and the movable elements 54, 56 when the cleaning fluid is ejected from the outflow portion 14 of the fluid processing body 12; and in the inactive position (FIGS. 2A, 3A and 4C), the one or more movable elements 54, 56 are moved away from the fluid processing body 12, such that the fluid processing body 12 and the container C can be functionally connected together for the preparation of the beverage product and/or the outflow of the beverage product.

Therefore, according to any of the specific embodiments of the fluid processing device 10 described so far, in its active position the cleaning device 52 can be configured for cleaning a fluid processing body 12 capable of operating as a combined inlet fluid processing device and outlet fluid processing device (as disclosed in the drawings), or as an inlet fluid processing device only (not disclosed in the drawings), or an outlet fluid processing device only (not disclosed in the drawings).

It is to be noted that, according to the invention, the chamber at least partially enclosing the fluid processing body 12 may be an open chamber (i.e. a chamber not completely surrounding the fluid processing body 12) or a closed chamber (i.e. a chamber completely surrounding the fluid processing body 12).

According to the embodiments of the cleaning device 52 shown in FIGS. 2A-2B, 3A and 4A-4C, the cleaning body is provided with at least two movable elements 54, 56 which define the chamber for housing the fluid processing body 12 of the fluid processing device 10. Therefore, as shown for example in FIGS. 2C-2H, 3B-3E and 4D-4F, the movement means 60; 62, 64, 66; 76 preferably comprise a motorized actuation system 60 for automatically moving these two movable elements 54, 56 of the cleaning device 52 relatively one to another between at least the active position, which is actually a "closed" position of the two movable elements 54, 56 and wherein the two movable elements are connected together and define the chamber, and the inactive position, which is actually an "open" position of the two movable elements 54, 56 and wherein the two movable elements 54, 56 are moved away one to another and open the chamber, and vice versa. In this way, the cleaning process performed by the cleaning device 52 can be actuated automatically, for example after each beverage preparation cycle is finished, without the user's intervention.

According to a preferred aspect of the present invention, the cleaning device 52 is conveniently provided with at least one outlet 58 for discharging the cleaning fluid in the active position of the movable elements 54, 56 after the completion of the cleaning cycle. Preferably, the cleaning cycle performed by the cleaning device 52 lasts for less than 20 seconds, more preferably less than 10 seconds. Even more preferably, the cleaning cycle performed by the cleaning device 52 lasts for about 5-6 seconds.

According to a first possible embodiment of the cleaning device 52, shown in FIGS. 2A-2H, the outlet 58 is formed by two complementary terminal portions 58A, 58B with semi-circular cross section, respectively obtained on a first movable element 54 and on a second movable element 56. These two terminal portions 58A, 58B are joined together in the active or closed position of the two movable elements 54, 56, so as to form an outlet 58 with a circular cross section. According to a second possible embodiment of the cleaning device 52, shown in FIGS. 3A-3E, the outlet 58 consists of a tubular conduit obtained on at least one of the two movable elements 54, 56.

As previously mentioned, the cleaning fluid is preferably water. In one embodiment of the cleaning apparatus according to the present invention, after the completion of the cleaning cycle the cleaning fluid is delivered by the outlet 58 towards a dustbin or a waste tank (not shown) of the beverage preparation machine 1. In another preferred embodiment, the cleaning fluid is hot water (at a temperature of at least 85° C.), the same as the fluid substance used for preparing the beverage product, and it is used for finishing the preparation of the volume of beverage product into the container C. Typically, the cleaning fluid enclosed in the chamber formed by the movable elements 54, 56 and used in the active or closed position of the cleaning device 52 has a volume less than 100 ml, preferably less than 50 ml, and more preferably less than 35 ml.

In all the preferred embodiments of FIGS. 2A-4F of the cleaning apparatus according to the present invention, the movable elements 54, 56 are shell-shaped, whereas the outer surface of the fluid processing body 12 has a shape that is substantially identical to the shape of the internal surface of these movable elements 54, 56. It has been found that the cleaning efficiency of the cleaning device 52 is improved particularly when the average distance between the outer surface of the fluid processing body 12 and the internal surface of the movable elements 54, 56, in the active or closed position, is lower than a certain value. More specifically, this average distance value is preferably less than 5 mm, more preferably less than 3 mm, and even more preferably less than 1 mm.

Preferably, as shown in the embodiments of the cleaning device 52 of FIGS. 2A-2B, 3A and 4A-4C, the fluid processing body 12 and the movable elements 54, 56 of the cleaning device 52 are both connected to a base portion 74. In these embodiments the movement means 60; 62, 64, 66; 76 comprise one or more actuation arms 62, 64 for connecting the movable elements 54, 56 to the base portion 74. The base portion 74, at one end thereof, is provided with a coupling portion 46. This coupling portion 46 is arranged for coupling the base portion 74, and thus the fluid processing device 10 and the cleaning device 52, to the beverage preparation machine 1. Conveniently, the coupling between the base portion 74 and the beverage preparation machine 1 is of a removable type, such that the assembly formed by the fluid processing device 10, the cleaning device 52 and the base portion 74 (see the embodiments of FIGS. 2A-2B, 3A and 4A-4C) can be easily mounted and dismounted by the user with respect to the beverage preparation machine 1. Preferably, the base portion 74 is also provided with at least one inlet conduit 82 of the cleaning fluid, such that the cleaning device 52 can be fed with said cleaning fluid once the assembly formed by the fluid processing device 10, the cleaning device 52 and the base portion 74 is mounted on the beverage preparation machine 1.

According to all the embodiments shown in FIGS. 2A-4F, wherein the cleaning device 52 is automatically actuated, the actuation arms 62, 64 which are connected to each movable element 54, 56 are actuated by the motorized actuation system 60 between at least one of the active position and the inactive position of the movable element 54, 56 and vice-versa.

According to other possible embodiments of the cleaning device 52, not shown in the drawings, the movable elements 54, 56 could also be moved manually between their respective active position and inactive position and vice-versa, although the automatic actuation of the cleaning device 52 is preferred.

More specifically, according to a first possible embodiment of the cleaning device 52, shown in FIGS. 2A-2H, each actuation arm 62, 64 is hinged around a respective rotation pin 66 which is oriented along a substantially vertical axis B, such that each movable element 54, 56 is rotated on a substantially horizontal plane between the active position and the inactive position and vice-versa.

According to a second possible embodiment of the cleaning device 52, shown in FIGS. 3A-3E, each actuation arm 62, 64 is hinged around a respective rotation pin 68 which is oriented along a substantially horizontal axis K, such that each movable element 54, 56 is rotated on a substantially vertical plane between the active position and the inactive position and vice-versa.

According to a third possible embodiment of the cleaning device 52, shown in FIGS. 4A-4F, each actuation arm 62, 64 is hinged around a respective rotation pin 68 which is once again oriented along a first substantially horizontal axis, such that each movable element 54, 56 is rotated on a substantially vertical plane between the active position and the inactive position and vice-versa. In this last embodiment the fluid processing device 10 too is rotatable around a second substantially vertical axis D to selectively engage and disengage with the cleaning device 52.

Preferably, in the embodiment of FIGS. 2A-2H, i.e. in the embodiment in which the movable elements 54, 56 are rotated on a substantially horizontal plane, the relative movement between the fluid processing device 10 and the container C is a vertical movement. This relative movement allows the fluid processing body 12 to perforate, and/or pierce, and/or tear a specific portion or wall of the container C before the introduction of the fluid substance into said container C. The container C could be maintained fixed with respect to the beverage preparation machine, so that the fluid processing device 10 is vertically moved relatively to said container C to reach the respective operative condition. Alternatively, the fluid processing device 10 could be maintained fixed with respect to the beverage preparation machine, so that the container C is vertically moved relatively to said fluid processing device 10. However, it should be pointed out that, in possible different embodiments of the fluid processing device 10 (not shown in the drawings), the relative movement between said fluid processing device 10 and the container C can also be directed differently, e.g. horizontally or along any inclined axis, that is, an axis inclined according to any suitable angle with respect to a vertical and/or horizontal axis.

Even the movement of the movable elements 54, 56 between the active position and the inactive position and vice-versa can be different with respect to those described so far with reference to the embodiments of FIGS. 2A-2H, 3A-3E and 4A-4F. In general, the relative movement between the fluid processing device 10 and the container C should be performed in such a way that it does not conflict with the movement of the movable elements 54, 56 between the active position and the inactive position and vice-versa. Preferably, the relative movement between the fluid processing device 10 and the container C should be on a different plane and/or along a different axis with respect to the movement of the movable elements 54, 56 between the active position and the inactive position and vice-versa. These different movements are preferred for hygienic purposes, so as to avoid that one or more of the movable parts of the cleaning device 52 come into contact with the container C in any operative configuration of the beverage preparation machine.

In the embodiments wherein the cleaning device 52 is automatically actuated, the motorized actuation system 60 may for example comprise a gear mechanism 70 (see FIGS. 3B-3E) or a cam mechanism (see FIGS. 2C-2H and 4D-4F). The embodiment of FIGS. 3B-3E comprise a sliding transmission device 72 interposed between each movable element 54, 56 and the gear mechanism 70. The sliding transmission device 72 is connected, at one end thereof, to at least one of the actuation arms 62, 64 and, at the opposite end thereof, to the gear mechanism 70 for moving each movable element 54, 56 between at least one of the active position and the inactive position and vice-versa. However, it should be pointed out that the gear mechanism 70 per se is known in the state of the art, and other mechanisms of the motorized actuation system 60 could be provided for moving the movable elements 54, 56.

For example, as shown in the embodiment of FIGS. 2C-2H, the movement means comprise at least one elastic element 76 that maintains the movable elements 54, 56 in their inactive position. In this embodiment the motorized actuation system 60 comprise a cam mechanism 80 (FIG. 2E) provided with at least one fixed pusher element 78 interposed between the movable elements 54, 56. The cam mechanism 80 is actuated by the motorized actuation system 60 for pushing the movable elements 54, 56 against two respective pusher elements 78, opposing the elastic force of the elastic element 76. In this way, the active position of the movable element 54, 56 is automatically obtained through the movement of the components of the motorized actuation system 60, whereas the inactive position of these movable element 54, 56 is automatically obtained too when the elastic force of the elastic element 76 can be exerted, i.e. when the movable elements 54, 56 are released from the respective pusher elements 78.

Figure 4D:
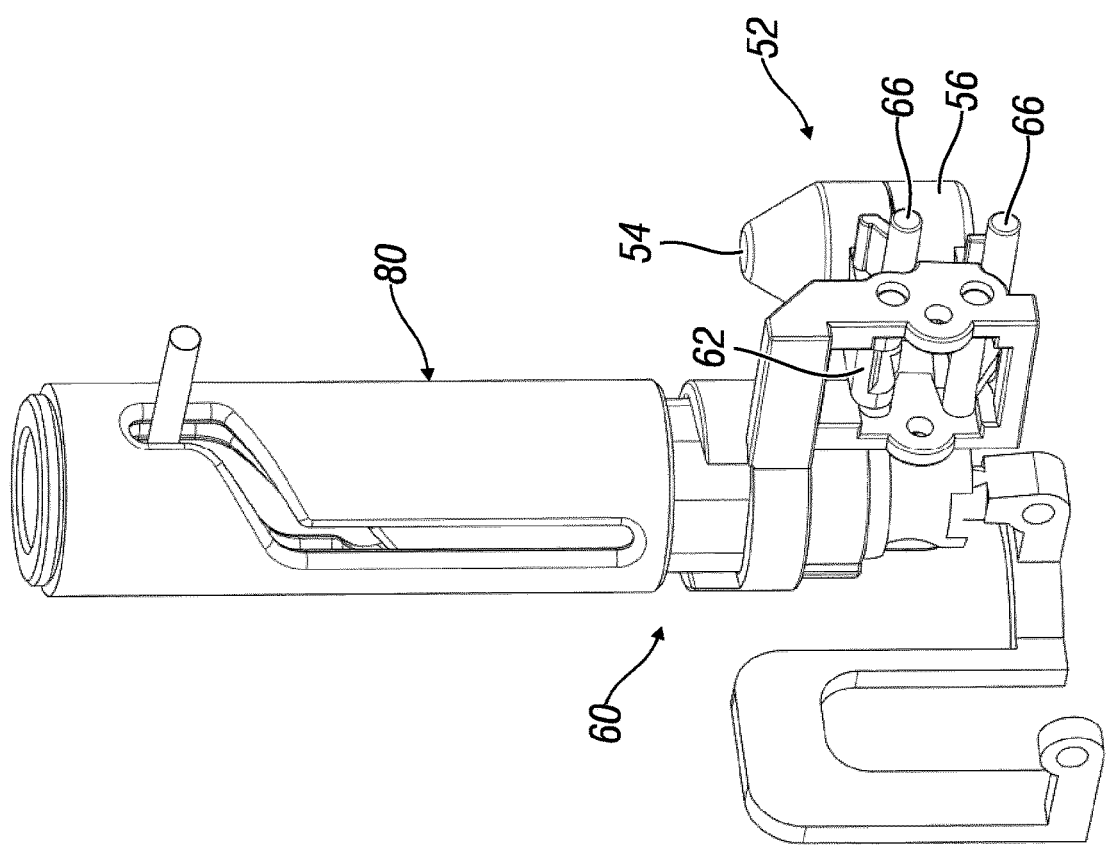
FIG. 4D is a perspective view of the cleaning apparatus of FIG. 4A, wherein the cleaning apparatus is connected to a beverage preparation machine and the cleaning device is shown in an active or closed position.
Figure 4F:
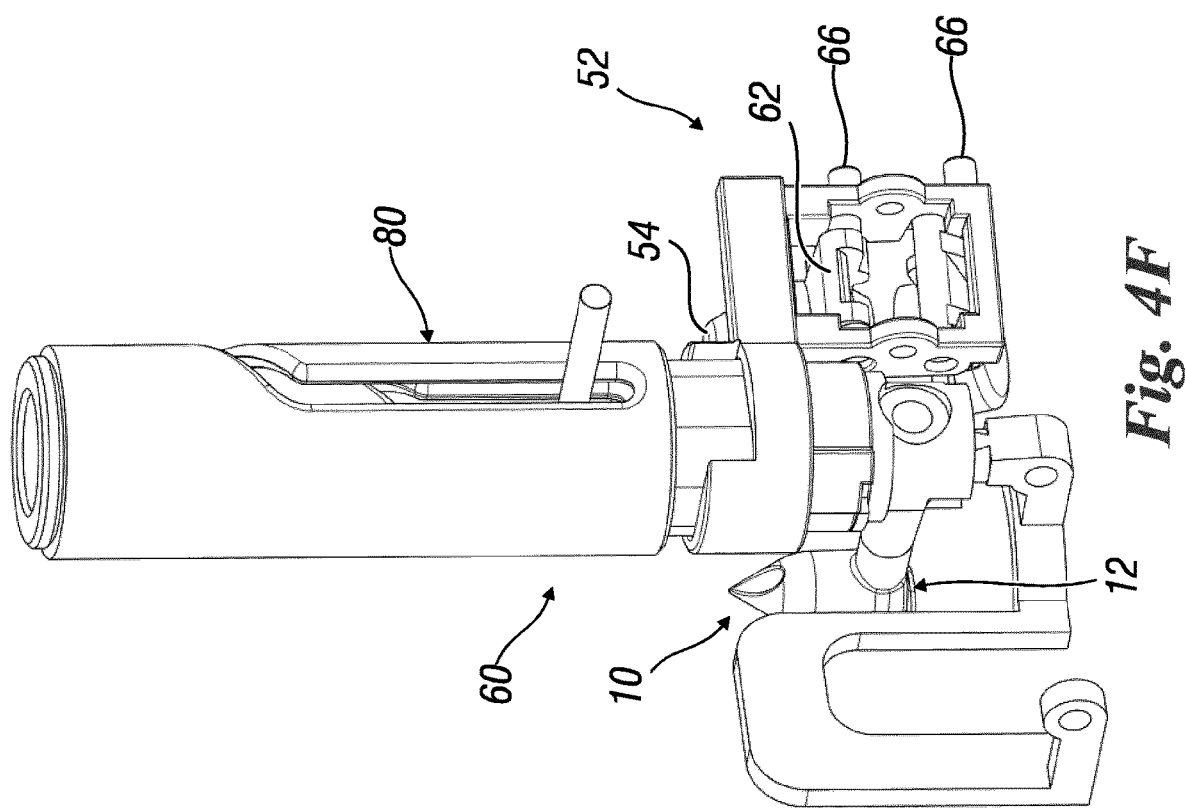
FIG. 4F is a perspective view of the cleaning apparatus provided with the cleaning device of FIG. 4A, wherein the cleaning apparatus is connected to a beverage preparation machine and the cleaning device is shown once again in an inactive or open position, but with the fluid processing device ready for the introduction inside the ingredient storage container.

The embodiment of FIGS. 4D-4F discloses movement means comprising a cam mechanism 80 and fixed pusher elements 78 of the same type disclosed for the embodiment of FIGS. 2C-2H.

According to the invention, once the outflow of the beverage product from the container C has been completed, the cleaning apparatus is actuated. If necessary, the fluid processing device 10 to be cleaned is positioned in a cleaning position (this is the case, for example, of the embodiment of FIGS. 4A-4F, wherein the fluid processing device 10 is rotated in the cleaning position disclosed in FIG. 4B), then the movable elements 54, 56 are moved in their active position, enclosing the fluid processing body 12 (FIGS. 2E, 3C and 4A) in the chamber defined by the two closed elements 54, 56. Then, through the inlet portion 14 and the inlet means 18 of the fluid processing body 12, a predefined volume of the cleaning fluid is injected in the chamber housing the fluid processing body 12.

Preferably, the cleaning fluid is hot water (for example at a temperature of at least 85° C.), the same fluid as the fluid substance used for preparing the beverage product. Typically, the cleaning fluid enclosed in the chamber formed by the one or more movable elements 54, 56 and used in the active position of the cleaning device 52 has a volume less than 100 ml, preferably less than 50 ml, and more preferably less than 35 ml.

After this injection, the cleaning fluid is preferably delivered by the outlet 58 towards the same container wherein the beverage has flown and this cleaning fluid, which indeed is water with traces of the beverage freshly prepared, is thus used for finishing the preparation of the volume of beverage product into the container C. According to another embodiment (not shown), the cleaning fluid is discharged in a dustbin or a waste tank (not shown) of the beverage preparation machine 1.

It should be understood that various changes and modifications to the presently preferred embodiments of the cleaning apparatus for a beverage preparation machine described herein will be apparent to those skilled in the art. Such changes and modifications can be made without departing from the scope of the present invention covered by the appended claims.

For example, in another embodiment of the cleaning apparatus, not shown in the drawings, the outflow portion for the outflow of the cleaning fluid could not be necessarily embedded in the fluid processing body of the fluid processing device. On the contrary, for example, this outflow portion for the outflow of the cleaning fluid could consists of one or more dedicated cleaning conduits provided in one or more of the movable elements of the cleaning device.

In further embodiments of the cleaning apparatus, again not shown in the drawings, the cleaning body of the cleaning device could also be different with respect to that described so far, i.e. a cleaning body comprising two mutually engageable movable elements. For example, the cleaning body could comprise a single fixed element or a single movable element, wherein the terms "fixed" and "movable" are intended with respect to the fluid processing body of the fluid processing device. Additionally, the cleaning body could also comprise a combination of at least one fixed element and at least one movable element.

More specifically, in one possible embodiment of the cleaning apparatus the cleaning body of the cleaning device could be provided with at least one fixed element alternatively or additionally to the two movable elements described so far. For example, the cleaning body of the cleaning device could be provided with one fixed element, operatively connected to the fluid processing device and placed at a predefined distance from the fluid processing body, as well as with a complementary movable element, which is positioned away from the fixed element in the inactive position of the cleaning device, but which is put in contact with the fixed element in the active position of the cleaning device, so as to form the chamber that encloses the fluid processing body and allows the circulation of the cleaning fluid.

Alternatively, in another possible embodiment of the cleaning apparatus the cleaning body of the cleaning device could be provided with one element only, which could be either a rigid or a flexible (e.g. a sachet) element and which could be either a fixed or a movable element. For example, the cleaning body of the cleaning device could be a single fixed element assembled around the fluid processing body of the fluid processing device at a predefined distance thereof and suitable for showering the fluid processing body.

The cleaning body of the cleaning device could also be a single movable element that is moved to at least partially surround the fluid processing body of the fluid processing device when needed. For example, starting from the embodiment of FIGS. 4A-4F, the single movable cleaning element could consist in the upper shell 54 only, which is obviously sized and shaped for properly housing at least a portion of the fluid processing body 12 in the active position. This single upper shell 54, as shown in FIGS. 4A-4F, can be cup shaped and can be moved downwardly to reach its active position, so as to come like a "hat" onto the fluid processing body 12 without the needing of the corresponding lower shell 56. Actually, it has been found that, also with such a single movable element of the cleaning device, a cleaning cycle that is efficient can be provided.

With regard to the embodiment of FIGS. 4A-4F, the cleaning element could be also a single fixed cleaning element, consisting of the upper shell 54 only, but disconnected from any movement means. According to this further embodiment, the fluid processing body 12 is provided with movement means able to bring the fluid processing body 12 in a first position, wherein it is at least partially enclosed in the upper fixed shell 54, and in a second position, wherein it is outside said upper fixed shell 54.

Regardless of whether the cleaning body comprises one or more fixed or movable elements, these elements can be obviously provided with at least one outlet for discharging the cleaning fluid once the cleaning operation of the fluid processing body is completed, and also with one or more further outlets for allowing the normal operation of the fluid processing body, i.e. the outlet of the fluid substance into the container for the preparation of the beverage product and/or the subsequent outflow of the beverage product, once its preparation is finished, from the container.

The invention claimed is:

1. A cleaning apparatus for a beverage preparation machine, the cleaning apparatus comprising at least one fluid processing device comprising a fluid processing body provided with an outflow portion for the outflow of a cleaning fluid, wherein the fluid processing body comprises the following members:
   an inlet member for introducing a fluid substance into a container (C) for the preparation of a beverage product by mixing of the fluid substance with an ingredient contained in the container (C); and
   an outlet member for allowing the outflow of the beverage product from the container (C) once the fluid substance is introduced into the container (C) and is mixed with the ingredient,
wherein the cleaning apparatus further comprises a cleaning device comprising:
   a cleaning body comprising one or more movable elements defining a chamber for housing at least a portion of the fluid processing body; and
   a movement member for moving the one or more movable elements between an active position and an inactive position,
and wherein the one or more movable elements and the fluid processing body are dimensioned and shaped such that:
   in the active position, the one or more movable elements enclose at least a portion of the fluid processing body in the chamber, such that the cleaning fluid can circulate in a space between the fluid processing body and the one or more movable elements when the cleaning fluid is ejected from the outflow portion of the fluid processing body; and
   in the inactive position, the one or more movable elements are moved away from the fluid processing body, such that the fluid processing body and the container (C) can be functionally connected together for the preparation of the beverage product and/or the outflow of the beverage product.

2. The cleaning apparatus according to claim 1, wherein the cleaning body is provided with at least two movable elements, wherein the movement member comprises a motorized actuation system for automatically moving the at least two movable elements relatively one to another between at least one of:
   the active position, wherein the at least two movable elements are connected together and define the chamber, and
   the inactive position, wherein the at least two movable elements are moved away one to another and open the chamber, and vice versa.

3. The cleaning apparatus according to claim 1, wherein the cleaning device is provided with at least one outlet for discharging the cleaning fluid.

4. The cleaning apparatus according to claim 1, wherein both the fluid processing body and each of the movable elements are connected to a base portion, wherein the movement member comprises one or more actuation arms for connecting each of the movable elements to the base portion.

5. The cleaning apparatus according to claim 4, wherein the base portion is provided with a coupling portion, arranged for removably coupling the base portion to the beverage preparation machine, and with at least one inlet conduit of the cleaning fluid.

6. The cleaning apparatus according to claim 2, wherein the movement member comprises one or more actuation arms which are connected to each movable element, the actuation arms being actuated by the motorized actuation system between at least one of the active position and the inactive position and vice-versa.

7. The cleaning apparatus according to claim 6, wherein the one or more actuation arms are hinged around a respective rotation pin oriented:
   along a substantially vertical axis (B), such that each movable element is rotated on a substantially horizontal plane between the active position and the inactive position and vice-versa; or
   along a substantially horizontal axis (K), such that each movable element is rotated on a substantially vertical plane between the active position and the inactive position and vice-versa.

8. The cleaning apparatus according to claim 6, wherein the one or more actuation arms are hinged around a respective rotation pin oriented along a first axis (K), such that each movable element is rotated between the active position and the inactive position and vice-versa, wherein the fluid processing device too is rotatable around a second axis (D) to selectively engage and disengage with the cleaning device.

9. The cleaning apparatus according to claim 6, wherein the motorized actuation system comprises a gear mechanism, wherein a sliding transmission device is interposed between each movable element and the gear mechanism, the sliding transmission device being connected, at one end thereof, to at least one of the actuation arms and, at the opposite end thereof, to the gear mechanism for moving each movable element between at least one of the active position and the inactive position and vice-versa.

10. The cleaning apparatus according to claim 6, wherein the movement member comprises at least one elastic element that maintains the movable elements in the inactive position, wherein the motorized actuation system comprises a cam mechanism provided with at least one pusher element interposed between the movable elements, the cam mechanism being actuated by the motorized actuation system for pushing the movable elements against the at least one pusher element, opposing the elastic force of the at least one elastic element, to obtain the active position.

11. The cleaning apparatus according to claim 1, wherein the one or more movable elements are shell-shaped, and in that the outer surface of the fluid processing body has a shape that is substantially identical to the shape of the internal surface of the one or more movable elements.

12. The cleaning apparatus according to claim 1, wherein the average distance between the outer surface of the fluid processing body and the internal surface of the one or more movable elements, in the active position, is less than 5 mm.

13. The cleaning apparatus according to claim 1, wherein the volume of the chamber defined by the one or more movable elements, in their active position, is less than 100 ml.

14. A beverage preparation machine comprising:
   a fluid circulation system for a fluid substance, the fluid circulation system comprising at least one fluid source, at least one fluid pump and at least one fluid circulation conduit;
   at least one container holder adapted for receiving a corresponding container (C); and
   a cleaning apparatus comprising at least one fluid processing device comprising a fluid processing body provided with an outflow portion for the outflow of a cleaning fluid, wherein the fluid processing body comprises the following members:
      inlet member for introducing a fluid substance into a container (C) for the preparation of a beverage product by mixing of the fluid substance with an ingredient contained in the container (C); and
      outlet member for allowing the outflow of the beverage product from the container (C) once the fluid substance is introduced into the container (C) and is mixed with the ingredient,
   and wherein the cleaning apparatus further comprises a cleaning device comprising:
      a cleaning body comprising one or more movable elements defining a chamber for housing at least a portion of the fluid processing body; and
      a movement member for moving the one or more movable elements between an active position and an inactive position,
   wherein the one or more movable elements and the fluid processing body are dimensioned and shaped such that:
      in the active position, the one or more movable elements enclose at least a portion of the fluid processing body in the chamber, such that the cleaning fluid can circulate in a space between the fluid processing body and the one or more movable elements when the cleaning fluid is ejected from the outflow portion of the fluid processing body; and
      in the inactive position, the one or more movable elements are moved away from the fluid processing body, such that the fluid processing body and the container (C) can be functionally connected together for the preparation of the beverage product and/or the outflow of the beverage product,
   wherein the cleaning apparatus, as well as the fluid processing device, is part of the fluid circulation system.

15. A cleaning apparatus for a beverage preparation machine, the cleaning apparatus comprising at least one fluid processing device comprising a fluid processing body provided with an outflow portion for the outflow of a cleaning fluid, wherein the fluid processing body comprises at least one of the following members:
   an inlet member for introducing a fluid substance into a container (C) for the preparation of a beverage product by mixing of the fluid substance with an ingredient contained in the container (C);
   an outlet member for allowing the outflow of the beverage product from the container (C) once the fluid substance is introduced into the container (C) and is mixed with the ingredient,
wherein the cleaning apparatus further comprises a cleaning device comprising:
   a cleaning body comprising one or more movable elements defining a chamber for housing at least a portion of the fluid processing body; and
   a movement member for moving the one or more movable elements between an active position and an inactive position,
and wherein the one or more movable elements and the fluid processing body are dimensioned and shaped such that:
   in the active position, the one or more movable elements enclose at least a portion of the fluid processing body in the chamber, such that the cleaning fluid can circulate in a space between the fluid processing body and the one or more movable elements when the cleaning fluid is ejected from the outflow portion of the fluid processing body; and in the inactive position, the one or more movable elements are moved away from the fluid processing body, such that the fluid processing body and the container (C) can be functionally connected together for the preparation of the beverage product and/or the outflow of the beverage product, wherein the one or more movable elements are shell-shaped, and in that the outer surface of the fluid processing body has a shape that is substantially identical to the shape of the internal surface of the one or more movable elements.

16. The cleaning apparatus according to claim 15, wherein the cleaning body is provided with at least two movable elements, wherein the movement member comprises a motorized actuation system for automatically moving the at least two movable elements relatively one to another between at least one of:

the active position, wherein the at least two movable elements are connected together and define the chamber, and the inactive position, wherein the at least two movable elements are moved away one to another and open the chamber, and vice versa.

17. The cleaning apparatus according to claim 15, wherein the cleaning device is provided with at least one outlet for discharging the cleaning fluid.

18. The cleaning apparatus according to claim 15, wherein both the fluid processing body and each of the movable elements are connected to a base portion, wherein the movement member comprises one or more actuation arms for connecting each of the movable elements to the base portion.

19. The cleaning apparatus according to claim 16, wherein the movement member comprises one or more actuation arms which are connected to each movable element, the actuation arms being actuated by the motorized actuation system between at least one of the active position and the inactive position and vice-versa.

20. A cleaning apparatus for a beverage preparation machine, the cleaning apparatus comprising at least one fluid processing device comprising a fluid processing body provided with an outflow portion for the outflow of a cleaning fluid, wherein the fluid processing body comprises at least one of the following members:

an inlet member for introducing a fluid substance into a container (C) for the preparation of a beverage product by mixing of the fluid substance with an ingredient contained in the container (C);

an outlet member for allowing the outflow of the beverage product from the container (C) once the fluid substance is introduced into the container (C) and is mixed with the ingredient, wherein the cleaning apparatus further comprises a cleaning device comprising:

a cleaning body comprising one or more movable elements defining a chamber for housing at least a portion of the fluid processing body; and a movement member for moving the one or more movable elements between an active position and an inactive position, and wherein the one or more movable elements and the fluid processing body are dimensioned and shaped such that:

in the active position, the one or more movable elements enclose at least a portion of the fluid processing body in the chamber, such that the cleaning fluid can circulate in a space between the fluid processing body and the one or more movable elements when the cleaning fluid is ejected from the outflow portion of the fluid processing body; and in the inactive position, the one or more movable elements are moved away from the fluid processing body, such that the fluid processing body and the container (C) can be functionally connected together for the preparation of the beverage product and/or the outflow of the beverage product, wherein both the fluid processing body and each of the movable elements are connected to a base portion, wherein the movement member comprises one or more actuation arms for connecting each of the movable elements to the base portion, and wherein the base portion is provided with a coupling portion, arranged for removably coupling the base portion to the beverage preparation machine, and with at least one inlet conduit of the cleaning fluid.

* * * * *